United States Patent
Babitsky et al.

(10) Patent No.: US 12,267,222 B2
(45) Date of Patent: Apr. 1, 2025

(54) CIRCUIT AND METHOD FOR TIMESTAMP FILTERING WITH INPUT/OUTPUT FORMAT CONVERSION

(71) Applicant: Marvell Asia Pte Ltd, Singapore (SG)

(72) Inventors: Eliya Babitsky, Caesarea (IL); Moran Noiman, Kiryat Ono (IL); Adi Katz, Ramat Gan (IL); Yaakov Yehezkel, Rehovot (IL); Ofer Halili, Karkur (IL); Tal Robinson, Giv'at Shmuel (IL)

(73) Assignee: Marvell Asia Pte Ltd, Singapore (SG)

( * ) Notice: Subject to any disclaimer, the term of this patent is extended or adjusted under 35 U.S.C. 154(b) by 344 days.

(21) Appl. No.: 17/815,646

(22) Filed: Jul. 28, 2022

(65) Prior Publication Data

US 2024/0039819 A1  Feb. 1, 2024

(51) Int. Cl.
  *H04L 43/087* (2022.01)
  *H04L 43/0888* (2022.01)

(52) U.S. Cl.
  CPC ........ *H04L 43/087* (2013.01); *H04L 43/0888* (2013.01)

(58) Field of Classification Search
  CPC . H04L 43/087; H04L 43/0888; H04L 43/028; H04L 43/106
  (Continued)

(56) References Cited

U.S. PATENT DOCUMENTS

| | | | | |
|---|---|---|---|---|
| 2003/0149907 A1* | 8/2003 | Singh | ........................ | H03L 7/00 713/500 |
| 2015/0092797 A1* | 4/2015 | Aweya | ................... | H04J 3/0667 370/516 |

(Continued)

FOREIGN PATENT DOCUMENTS

| | | | | |
|---|---|---|---|---|
| CN | 102420687 A | * | 4/2012 | |
| CN | 105306159 A | * | 2/2016 | .............. H04J 3/067 |

(Continued)

OTHER PUBLICATIONS

"Polynomial Kalman Filters, Fundamentals of Kalman Filtering: A Practical Approach," IAAC 2010 Workshops, Handouts, Mar. 16, 2017, retrieved from the Internet at http://iaac.technion.ac.il/workshops/2010/KFhandouts/LectKF4.pdf on Aug. 9, 2021.

(Continued)

*Primary Examiner* — Hashim S Bhatti
*Assistant Examiner* — Oladiran Gideon Olaleye
(74) *Attorney, Agent, or Firm* — Hamilton, Brook, Smith & Reynolds, P.C.

(57) ABSTRACT

A circuit and corresponding method perform timestamp filtering. The circuit comprises input format-conversion logic that converts a received timestamp from an original timestamp format to an intermediate timestamp format. The circuit further comprises recursive filter logic coupled to the input format-conversion logic. The recursive filter logic generates a filtered timestamp in the intermediate timestamp format by filtering the received timestamp in the intermediate timestamp format. The circuit further comprises output format-conversion logic coupled to the recursive filter logic. The output format-conversion logic converts the filtered timestamp from the intermediate timestamp format to the original timestamp format and outputs the filtered timestamp in the original timestamp format. Converting the received timestamp into a different format avoids use of complex logic to handle rollover of input values, thereby reducing area and power consumption of the circuit.

27 Claims, 11 Drawing Sheets

(58) Field of Classification Search
USPC .......................................................... 370/252
See application file for complete search history.

(56) References Cited

U.S. PATENT DOCUMENTS

| | | | |
|---|---|---|---|
| 2015/0110233 A1 | 4/2015 | Azenkot et al. | |
| 2015/0189614 A1 | 7/2015 | Tian et al. | |
| 2017/0293967 A1* | 10/2017 | Gilbey | G06Q 20/202 |
| 2019/0036803 A1 | 1/2019 | Kumar et al. | |
| 2020/0007331 A1 | 1/2020 | Wentz | |
| 2020/0212918 A1 | 7/2020 | Elkholy | |
| 2020/0280749 A1* | 9/2020 | Nakamura | H04N 21/4305 |
| 2022/0123877 A1 | 4/2022 | Ranganathan et al. | |
| 2023/0421507 A1 | 12/2023 | Prema et al. | |
| 2024/0039822 A1 | 2/2024 | Babitsky et al. | |
| 2024/0048469 A1 | 2/2024 | Babitsky et al. | |

FOREIGN PATENT DOCUMENTS

| | | | | |
|---|---|---|---|---|
| CN | 110329273 A * | 10/2019 | | B60W 50/00 |
| WO | WO-0119005 A1 * | 3/2001 | | H04J 3/0644 |
| WO | WO-2009088908 A1 * | 7/2009 | | G01P 3/44 |
| WO | WO-2021159005 A1 * | 8/2021 | | H04L 43/0852 |

OTHER PUBLICATIONS

Lewis, "cloud radio access network (C-RAN)," SearchNetworking.com, Jan. 8, 2019, retrieved from the Internet at https://www.techtarget.com/searchnetworking/definition/cloud-radio-access-network-C-RAN, on Oct. 12, 2021.

Venmani et al., "EAI Endorsed Transactions on Industrial Networks and Intelligent Systems," Jun. 2018-Sep. 2018, vol. 5. Issue 15, e3, Received on Jul. 3, 2018, accepted on Jul. 23, 2018, published on Aug. 13, 2018.

EDN, "Synchronizer techniques for multi-clock domain SoCs & FPGAs," Sep. 30, 2014, Retrieved from the Internet on Oct. 14, 2021 at https://www.edn.com/synchronizer-techniques-for-multi-clock-domain-socs-fpgas/.

"Recursive Least Squares Filtering," IAAC 2010 Workshops, Handouts, Mar. 16, 2017, retrieved from the Internet at http://iaac.technion.ac.il/workshops/2010/KFhandouts/LectKF3.pdf on Oct. 19, 2021.

Welch, et al., "An Introduction to the Kalman Filter," Department of Computer Science University of North Carolina at Chapel Hill, Sep. 17, 1997.

Non-Final Office Action received for U.S. Appl. No. 17/815,652, mailed on Nov. 26, 2024, 24 pages.

* cited by examiner

350 MHz → 800 MHz
(e.g., clkA →clkB)

550 MHz → 800 MHz
(e.g., clkA →clkB)

750 MHz → 800 MHz
(e.g., clkA →clkB)

1000 MHz → 800 MHz
(e.g., clkA →clkB)

1300 MHz → 800 MHz
(e.g., clkA →clkB)

CIRCUIT AND METHOD FOR TIMESTAMP FILTERING WITH INPUT/OUTPUT FORMAT CONVERSION

BACKGROUND

Cloud radio access network (C-RAN) is a centralized, cloud computing-based architecture for radio access networks (RANs) that enables large-scale deployment, collaborative radio technology support, and real-time virtualization capabilities. C-RAN is an evolution of the wireless communication system and uses the common public radio interface (CPRI) standard, coarse or dense wavelength division multiplexing (CWDM/DWDM) technology, and millimeter wave (MM wave) transmission for long distance signals. The "C" in C-RAN can alternatively stand for "centralized" or "collaborative." In the C-RAN architecture, baseband processing units (BBUs) are decoupled from the radio heads and relocated to a centralized control and processing station. C-RANs are significant in the future progress of wireless technology, such as the fifth-generation (5G) and Internet of Things (IoT) wireless technologies for non-limiting examples. C-RAN is one of the key enablers for 5G.

5G C-RAN-based systems rely on high accuracy time synchronization between radio heads for improved performance. Typically, the Institute of Electrical and Electronics Engineers (IEEE) 1588-2008 standard for precision time protocol (PTP), or a version thereof, is used for such time synchronization. The standard enables heterogeneous systems that include clocks of various inherent precision, resolution, and stability to synchronize to a grandmaster clock. The standard supports system-wide synchronization accuracy in the sub-microsecond range, with minimal network and local clock computing resources.

SUMMARY

According to an example embodiment, a circuit comprises input format-conversion logic configured to convert a received timestamp from an original format to an intermediate format. The circuit further comprises recursive filter logic coupled to the input format-conversion logic. The recursive filter logic is configured to generate a filtered timestamp in the intermediate format by filtering the received timestamp in the intermediate format. The circuit further comprises output format-conversion logic coupled to the recursive filter logic. The output format-conversion logic is configured to convert the filtered timestamp from the intermediate timestamp format to the original timestamp format and output the filtered timestamp in the original timestamp format.

The original timestamp format may be based on seconds and nanoseconds and the intermediate timestamp format may be based on seconds and fractional seconds for non-limiting examples.

The input format-conversion logic may include a first multiplier. The first multiplier may be configured to multiply the received timestamp in the original timestamp format by an input conversion value configured to convert the original timestamp format to the intermediate timestamp format. The output format-conversion logic may include a second multiplier. The second multiplier may be configured to multiply the filtered timestamp in the intermediate timestamp format by an output conversion value configured to convert the intermediate timestamp format to the original timestamp format. For non-limiting example, the input conversion value and the output conversion value may be configured such that a product of the input conversion value and the output conversion value is one.

The recursive filter logic may be further configured to implement a recursive-least squares (RLS) filter. The RLS filter may be configured to generate an estimated timestamp value of a target timestamp based on at least a portion of the received timestamp, in the intermediate format. The filtered timestamp may be generated based on the estimated timestamp value generated.

The RLS filter may be further configured to determine a difference in consecutive values of the received timestamp, in the intermediate format, with higher accuracy relative to determining the difference via the consecutive values of the received timestamp, in the original format.

An accuracy of the estimated timestamp value generated may be improved based on conversion of the received timestamp from the original format to the intermediate format. The accuracy may be improved relative to generating the estimated timestamp value of the target timestamp based on the at least a portion of the received timestamp, in the original format.

The recursive filter logic may be further configured to reduce jitter in the filtered timestamp relative to jitter of the received timestamp. The jitter of the received timestamp may represent a deviation of the received timestamp from a target timestamp.

The circuit may be further configured to output the filtered timestamp generated to a timestamp consumer. The timestamp consumer may be configured to associate an incoming packet, outgoing packet, or combination thereof, with the filtered timestamp generated and output from the circuit.

The received timestamp may be received on a cycle-by-cycle basis. The recursive filter logic may be further configured to generate the filtered timestamp in real time, on the cycle-by-cycle basis. The cycle-by-cycle basis may be based on a clock cycle of a clock of the circuit.

The recursive filter logic may be further configured to reduce jitter in the filtered timestamp relative to jitter of the received timestamp. The received timestamp may be a synchronized timestamp, generated from an original timestamp by synchronizing the original timestamp across multiple clock domains. The jitter reduced may be dynamic jitter generated from the synchronizing.

According to another example embodiment, a method comprises converting a received timestamp from an original format to an intermediate format, generating, via recursive filter logic, a filtered timestamp in the intermediate format by filtering the received timestamp in the intermediate format via the recursive filter logic, converting the filtered timestamp from the intermediate timestamp format to the original timestamp format, and outputting the filtered timestamp in the original timestamp format.

Further alternative method embodiments parallel those described above in connection with the example circuit embodiment.

According to another example embodiment, an apparatus comprises means for converting a received timestamp from an original format to an intermediate format, means for generating a filtered timestamp in the intermediate format by filtering the received timestamp in the intermediate format via recursive filter logic, means for converting the filtered timestamp from the intermediate timestamp format to the original timestamp format, and means for outputting the filtered timestamp in the original timestamp format.

Further alternative method embodiments parallel those described above in connection with the example circuit embodiment.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

An example embodiment disclosed herein employs recursive filter logic. The recursive filter logic is recursive and, as such, re-uses one or more of its outputs as an input. Further, because the recursive filter logic is recursive, such logic may process new data as soon as it arrives in order to produce an estimate—as opposed to a batch processing technique that operates on all prior received data for each estimate. According to a non-limiting example embodiment, the recursive filter logic may be configured to implement a recursive least-squares (RLS) filter, which is a special case of a Kalman filter, disclosed further below with regard to equations (1) through (5), for non-limiting example. As such, the recursive filter logic that implements such a special case of the Kalman filter may also be referred to interchangeably herein as Kalman-filter-based (KFB) logic.

While an example embodiment disclosed herein may be disclosed within a context of a cloud/centralized radio access network (C-RAN), fifth-generation (5G) C-RAN, the Institute of Electrical and Electronics Engineers (IEEE) 1588-2008 (Precision Time Protocol) standard, a radio head, or a system on a chip (SoC), it should be understood that example embodiments disclosed herein are not limited to same.

5G C-RAN based systems rely on high accuracy time synchronization between radio heads for good performance. The IEEE 1588-2008 (Precision Time Protocol) is typically used for such time synchronization. In a 5G C-RAN network, it is useful for each endpoint to generate a local clock and timestamp incoming/outgoing packets as accurately as possible. The endpoint may, for non-limiting example, be a radio head that employs a 5G SoC (system on chip) that is configured to perform the timestamping. Modern 5G SoCs have multiple clock domains and, thus, the timestamp may be created in one clock domain of the SoC and used in another clock domain of the SoC. As such, timestamp synchronization is needed due to the clock domain crossing. This synchronization creates jitter, that is, differences in the value of the synchronized timestamp versus the ideal timestamp, as disclosed further below. An example embodiment disclosed herein reduces timestamp differences resulting from such synchronization, thereby improving jitter and, subsequently, 5G performance. An example embodiment of a circuit for timestamp jitter reduction is disclosed below with regard to FIG. 1.

Figure 1:
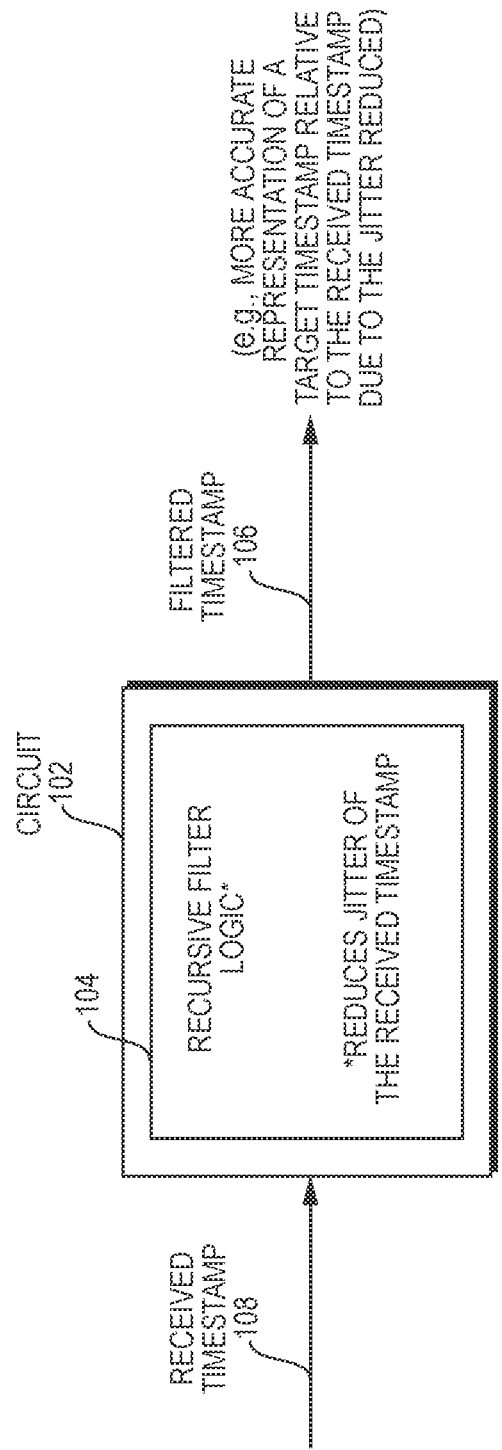
FIG. 1 is a block diagram of an example embodiment of a circuit for timestamp jitter reduction.

FIG. 1 is a block diagram of an example embodiment of a circuit 102 that comprises recursive filter logic 104. The circuit 102 is configured to (i) generate a filtered timestamp 106 from a received timestamp 108 by filtering the received timestamp 108 via the recursive filter logic 104. The recursive filter logic 104 is configured to reduce jitter (not shown) of the received timestamp 108. The jitter represents a deviation of the received timestamp 108 from a target (ideal, correct) timestamp (not shown), such as disclosed further below with regard to FIG. 3A and FIG. 3B. The circuit 102 is further configured to output the filtered timestamp 106 generated.

The filtered timestamp 106 generated and output is a more accurate representation of the target timestamp, relative to the received timestamp 108, due to the jitter reduced. According to an example embodiment, the circuit 102 may incorporated as a part of a system on a chip (SoC). It should be understood, however, that the circuit 102 is not limited thereto and may, for example, be implemented as a stand-alone integrated circuit (IC) chip for non-limiting example.

According to an example embodiment, the jitter may be dynamic jitter that results from timestamp synchronization across clock domains and the received timestamp 108 may be a synchronized timestamp. As is known in the art, a clock domain crossing occurs whenever data is transferred from an electronic circuit element driven by one clock to another electronic circuit element that is driven by another clock. A system on a chip (SoC) is an example of a system that typically has multiple clock domains. A timestamp created in one clock domain of the SoC, and used in another clock domain of the SoC, benefits from synchronization. The synchronization may, however, result in differences in the value of the synchronized timestamp versus an ideal timestamp and such differences represent dynamic jitter. According to an example embodiment, the received timestamp 108 may be a synchronized timestamp, such as the synchronized timestamp 208 of FIG. 2, disclosed below. The circuit 102 may be configured to reduce maximum and/or average jitter resulting from timestamp synchronization across multiple clock domains, as disclosed below with regard to FIG. 2.

Figure 2:
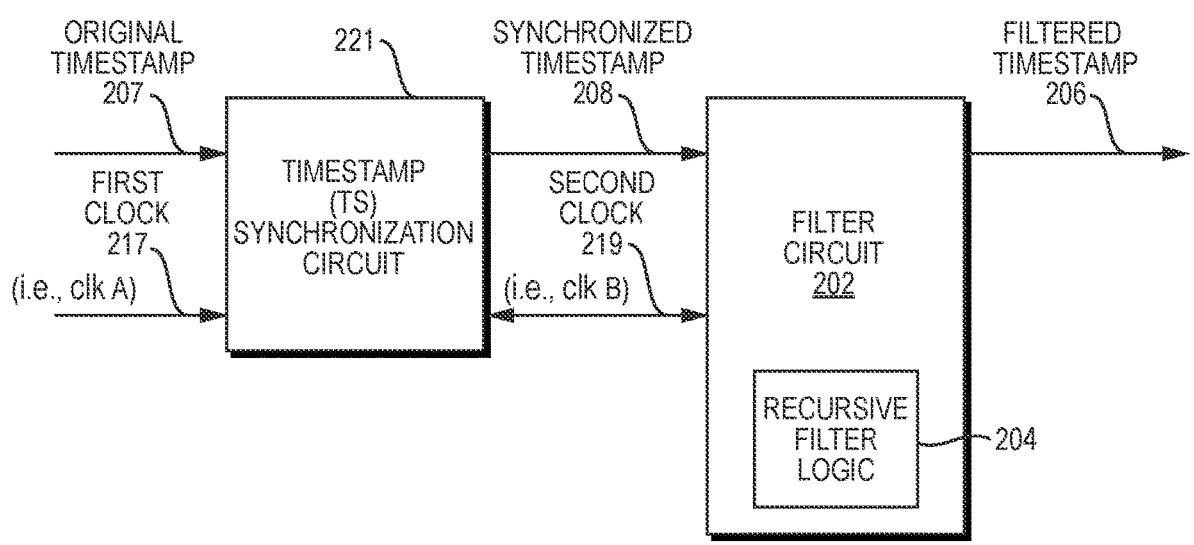
FIG. 2 is a block diagram of an example embodiment of a filter circuit coupled to a timestamp (TS) synchronization circuit.

FIG. 2 is a block diagram of an example embodiment of a filter circuit 202 coupled to a timestamp (TS) synchronization circuit 221. The filter circuit 202 may be the circuit 102 of FIG. 1, disclosed above. Continuing with reference to FIG. 2, the filter circuit 202 comprises recursive filter logic 204. The filter circuit 202 is configured to (i) generate a filtered timestamp 206 from a received timestamp, namely the synchronized timestamp 208, by filtering the received timestamp (i.e., the synchronized timestamp 208) via the recursive filter logic 204. The recursive filter logic 204 is configured to reduce jitter (not shown) of the received timestamp, that is, the synchronized timestamp 208. The jitter represents a deviation from a target (ideal, correct) timestamp (not shown), such as disclosed further below with regard to FIG. 3A and FIG. 3B. The filter circuit 202 is further configured to output the filtered timestamp 206 generated.

The filtered timestamp 206 generated and output is a more accurate representation of the target timestamp, relative to the received timestamp (i.e., the synchronized timestamp 208), due to the jitter reduced. The received timestamp (i.e., the synchronized timestamp 208) may be received on a cycle-by-cycle basis. The filter circuit 202 may be further configured to generate the filtered timestamp 206 in real time on the cycle-by-cycle basis. The cycle-by-cycle basis may be based on a clock cycle of a clock of the filter circuit 202, such as clk B of FIG. 2, disclosed below.

According to the example embodiment of FIG. 2, the synchronized timestamp 208 is generated from an original timestamp 207. The synchronized timestamp 208 is generated by synchronizing the original timestamp 207 across multiple clock domains, such as a first clock domain driven by a first clock 217, also referred to interchangeably herein as clk A, and a second clock domain driven by a second clock 219, also referred to interchangeably herein as clk B, for non-limiting example. In the example embodiment of FIG. 2, the received timestamp is the synchronized timestamp 208 that is generated from the original timestamp 207 by synchronizing the original timestamp 207 across the multiple clock domains. The jitter may be dynamic jitter that is generated from such synchronizing.

In the example embodiment of FIG. 2, the TS synchronization circuit 221 is configured to implement the synchronizing and generate the synchronized timestamp 208 from the original timestamp 207. The TS synchronization circuit 221 may implement any synchronizer technique for multi-clock domains known in the art and is not limited to any particular technique. There are multiple reasons for a presence of jitter in the synchronized timestamp 208. A main reason is that, even with a state-of-the-art-synchronization mechanism employed by the TS synchronization circuit 221, the synchronization mechanism will occasionally have at least one cycle of uncertainty, leading to missed samples. Other reasons for the presence of jitter may include rounding errors and/or initial timestamp generation with a clock (e.g., clk A) that is faster than a minimum increment/resolution of the timestamp for non-limiting examples. In general, a clock that is faster than the minimum increment of the timestamp (and whose period is not an integer multiple of that increment) will add jitter. Slow-clock-to-fast-clock conversions, for example, for cases in which clk A is slower relative to clk B, may also contribute to jitter as slow-to-fast synchronization results in several (fast) cycles when a timestamp value doesn't change. It should be understood, however, that even fast-to-slow (e.g., clk A is faster relative to clk B) synchronization may suffer from missed samples and rounding. An example embodiment of jitter resulting from the synchronization mechanism is disclosed below with regard to FIG. 3A and FIG. 3B.

Figure 3A:
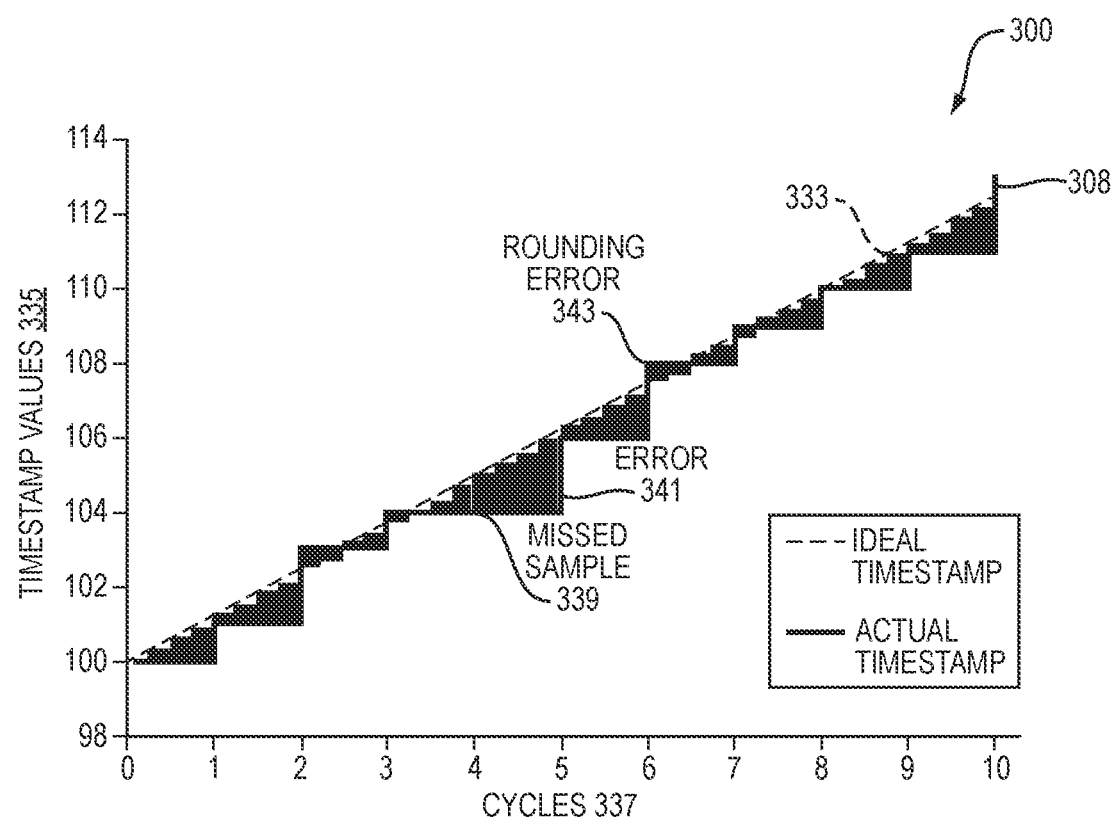
FIG. 3A is graph of an example embodiment of an actual timestamp versus an ideal timestamp.

FIG. 3A is graph 300 of an example embodiment of an actual timestamp 308 versus an ideal timestamp 333, that is, a target timestamp. The graph 300 plots timestamp values 335 for cycles 337 of a clock of a consumer, that is, a receiver of a timestamp that has been synchronized.

Continuing with reference to FIG. 2 and FIG. 3A, the consumer is the filter circuit 202 and the cycles 337 are cycles of the second clock 219, that is, clk B. In the graph 300, the actual timestamp 308 represents the received timestamp, that is, the synchronized timestamp 208. The actual timestamp 308 differs from the ideal timestamp 333 for reasons such as disclosed above. Errors, such as the missed sample 339, error 341 (e.g., due to inherent uncertainty in the clock domain synchronization), and rounding error 343 are all typical errors of any synchronization mechanism used to produce a synchronized timestamp, such as the synchronized timestamp 208. Such errors cause jitter in the synchronized timestamp 208, represented as the actual timestamp 308 in the graph 300. An example embodiment of the jitter in the actual timestamp 308 is shown in FIG. 3B, disclosed below.

Figure 3B:
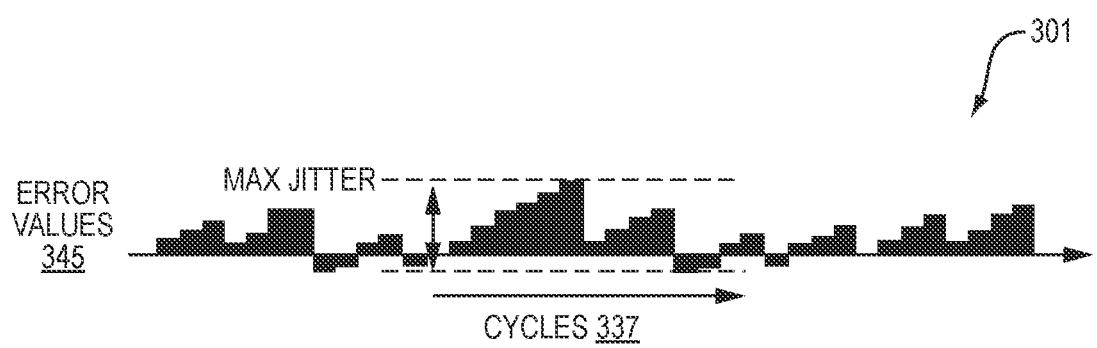
FIG. 3B is a plot of an example embodiment of jitter in the actual timestamp of FIG. 3A.

FIG. 3B is a plot of an example embodiment of the jitter 301 in the actual timestamp 308 of FIG. 3A. With reference to FIG. 3A and FIG. 3B, the jitter 301 is represented by the error values 345 over the cycles 337, where the error values 345 are differences between the actual timestamp 308 and the ideal timestamp 333 over the cycles 337. An example embodiment disclosed herein estimates the "correct" timestamp for the actual timestamp 308 (i.e., synchronized timestamp) based on the understanding that the ideal timestamp 333, namely the target timestamp, is a straight line, such as disclosed below with regard to FIG. 4.

Figure 4:
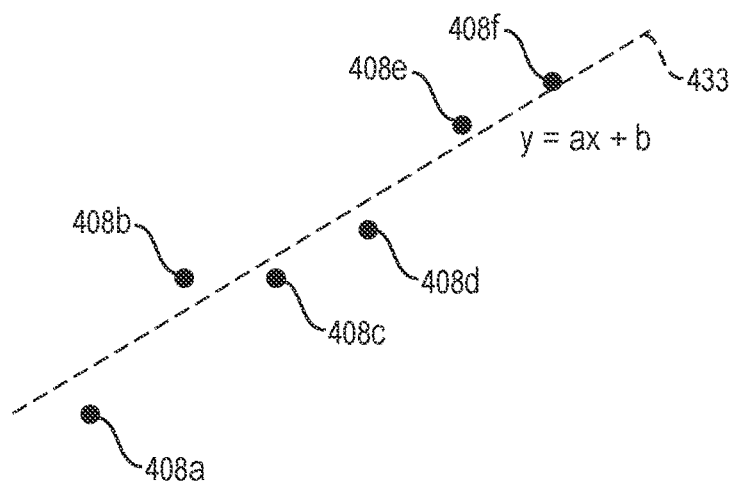
FIG. 4 is a linear representation of an example embodiment of an ideal timestamp.

FIG. 4 is a linear representation of an example embodiment of an ideal timestamp 433 that may also be referred to interchangeably herein as a target timestamp. The ideal timestamp 433 is a straight line represented by the equation $y=ax+b$, where y denotes the ideal timestamp value, a is the slope, x is the clock cycle, and b denotes the initial ideal timestamp value at clock cycle=0. The slope a represents a change in the ideal timestamp value that occurs over a number of clock cycles. Actual timestamp values of a synchronized timestamp, such as the actual timestamp values 408a, 408b, 408c, 408d, 408e, and 408f, do not lie on the straight line of the ideal timestamp 433 due to jitter, introduced by synchronization as disclosed above.

If all of the actual timestamp values (e.g., 408a, 408b, 408c, 408d, 408e, and 408f) were known in advance, the "correct" timestamp could be estimated by estimating linear coefficients and using calculus to minimize a sum of the squares of the individual errors in order to obtain the "best" coefficients. That is, a least-square linear fit, also referred to interchangeably herein as a "least squares method," could be employed. The least squares method is, however, a batch processing technique and, thus, all measurements need to be taken before estimates can be made. In addition, the least squares method relies on matrix multiplications and inversion, both of which are expensive due to the hardware complexity for implementing same. In contrast to a least squares method, an example embodiment estimates the correct (ideal, target) timestamp in real time and with low hardware complexity.

An example embodiment disclosed herein converts the batch processing least squares method to a recursive form and employs a recursive least-squares (RLS) filter to estimate the correct timestamp. An example embodiment disclose disclosed herein employs a special case of a Kalman filter. A Kalman filter is known in the art and details regarding same may be found, for non-limiting example, in "Polynomial Kalman Filters, Fundamentals of Kalman Filtering: A Practical Approach," IAAC 2010 Workshops, Handouts, Mar. 17, 2017, available via the Internet (e.g., iaac.technion.ac.il/workshops/2010/KFhandouts/LectKF4.pdf) (hereinafter, "Polynomial Kalman Filters non-patent-literature (NPL) document").

In a general Kalman filter, model parameters change over time and, as such, a general Kalman filter line estimation can change over time based on the broad Kalman filter equations. According to an example embodiment of recursive filter logic applied to time estimation as disclosed herein, however, a change in slope does not occur because the timestamp is estimated to be a linear function. According to an example embodiment, timestamp estimation may be based on gains of a first-order RLS filter.

Specifically, according to an example embodiment, a first gain and a second gain, namely $K_{1_k}$ and $K_{2_k}$, respectively, may be employed for timestamp estimation, that is, for estimating a target (ideal, correct) timestamp. Equations (1) and (2), disclosed below, may be used to determine the first and second gains, where k (i.e., the filter step) is incremented on each timestamp update and $T_s$ is the number of cycles since a last update.

$$K_{1_k} = \frac{2(2k-1)}{k(k+1)} k = 1, 2, \ldots, n \quad (1)$$

$$K_{2_k} = \frac{6}{k(k+1)T_s} \quad (2)$$

Such equations (1) and (2) are disclosed, for example, in the Polynomial Kalman Filters NPL document; however, they are not disclosed in the context of timestamp estimation.

According to an example embodiment disclosed herein, equations of a first order RLS filter may be employed for timestamp estimation and a value of k employed in equations (1) and (2), disclosed above, represents a current filter step, where k is incremented on each timestamp update, that is, each time a current timestamp value, $X_k^*$, is updated by a TS synchronizer, such as the TS synchronization circuit 221 of FIG. 2, disclosed above for non-limiting example. According to an example embodiment, $T_s$, as employed in equation (2) above, is a number of clock cycles since the timestamp value of the synchronized timestamp 208 of FIG. 2 was updated by the TS synchronizer 221.

According to an example embodiment, a residual error of the timestamp estimation at a current filter step k may be defined by:

$$\text{Res}_k = X_k^* - \hat{X}_{k-1} - \hat{\dot{X}}_{k-1} T_s \quad (3)$$

and the RLS filter, based on a first-order polynomial Kalman filter, becomes:

$$\hat{X}_k = \hat{X}_{k-1} + \hat{\dot{X}}_{k-1} T_s - K_{1_k} \text{Res}_k \quad (4)$$

$$\hat{\dot{X}}_k = \hat{\dot{X}}_{k-1} + K_{2_k} \text{Res}_k \quad (5)$$

where k is incremented on each timestamp update, $X^*$ is the current timestamp value from the synchronizer, $T_s$ is the number of cycles since the last update, $\hat{\dot{X}}$ is the estimated line slope of the ideal (target) timestamp, and $\hat{X}$ is the estimated timestamp value.

Given a new timestamp value, the RLS filter estimates the best $\hat{X}$, that is, the best estimated timestamp value, based on all values it has seen so far. In between timestamp updates (slow-to-fast), an example embodiment of the RLS filter estimates the timestamp by $\hat{X}_{k-1} + \hat{\dot{X}}_{k-1} \times T_s$. A generic example of a RLS filter tracking a linear signal with noise is disclosed with regard to FIG. 5, disclosed below.

Figure 5:
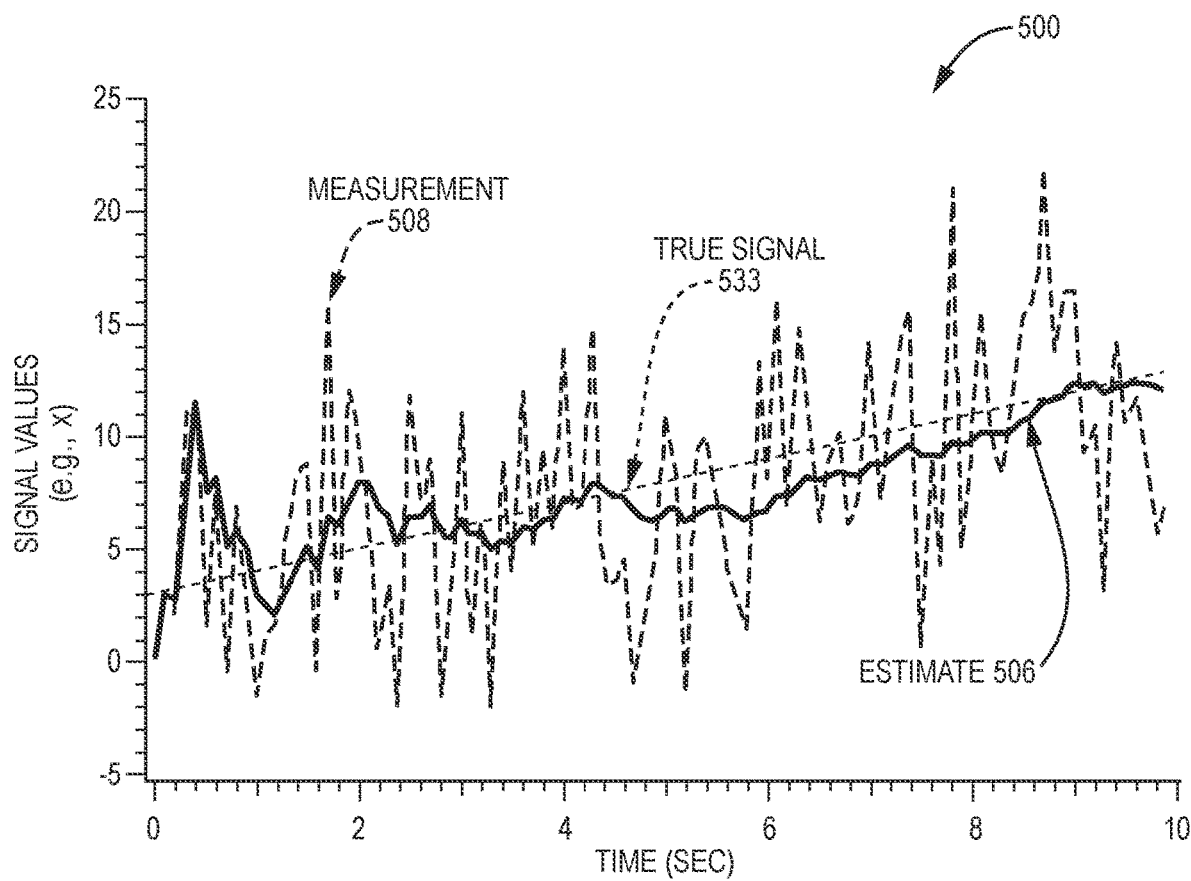
FIG. 5 is a graph of an example embodiment of signals over time that visualize an ability of a first-order recursive least squares (RLS) filter to track a first-order signal with noise.

FIG. 5 is a graph 500 of an example embodiment of signals over time that visualize an ability of a first-order recursive least squares (RLS) filter to track a first-order signal with noise. The graph 500 is disclosed in "*Recursive Least Squares Filtering*," IAAC 2010 Workshops, Handouts, Mar. 17, 2017, available via the Internet (iaac.technion.ac.il/workshops/2010/KFhandouts/LectKF3.pdf). Such signals include a measured signal, that is, the measurement 508 that is a noisy signal, a true signal 533, and an estimated signal, namely the estimate 506. The graph 500 is a generic example of a RLS filter tracking a linear signal with noise. An example embodiment disclosed herein employs an example embodiment of a RLS filter to reduce timestamp jitter as disclosed below with regard to FIG. 6.

Figure 6:
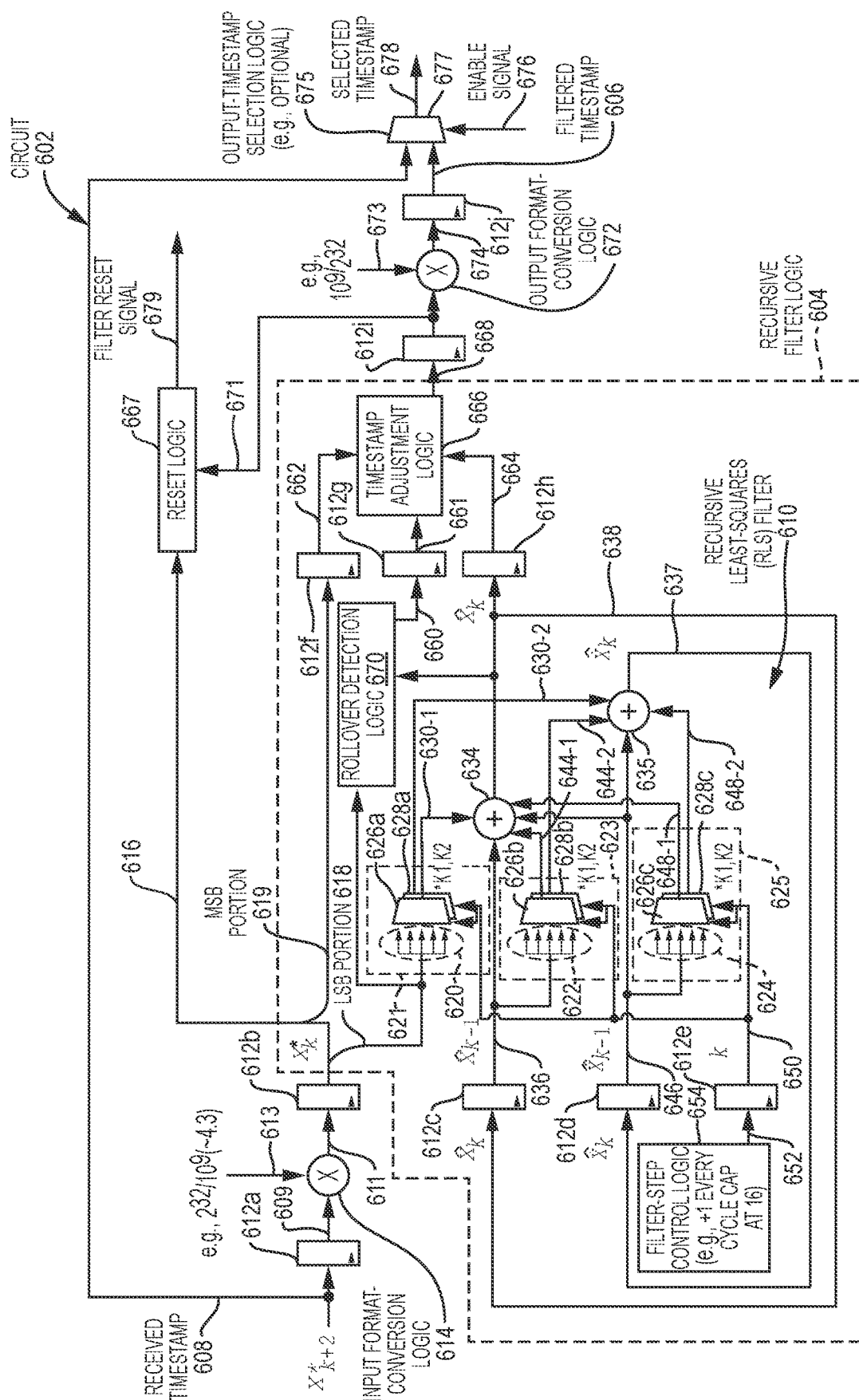
FIG. 6 is a schematic diagram of an example embodiment of a circuit for timestamp jitter reduction.

FIG. 6 is a schematic diagram of an example embodiment of a circuit 602 for timestamp jitter reduction. The circuit 602 may be employed as the circuit 102 and filter circuit 202, disclosed above with regard to FIG. 1 and FIG. 2, respectively. The circuit 602 is configured to estimate a "correct" (ideal, target) timestamp in real time and with low hardware complexity. The filtered timestamp 606 represents an estimate of such a correct timestamp. It should be understood that the circuit 602 is simplified for illustrative purpose and is not limited to the elements shown. Further, a circuit for timestamp jitter reduction disclosed herein is not limited to the specific design of the circuit 602.

The circuit 602 includes recursive filter logic 604. The circuit 602 is configured to generate the filtered timestamp 606 from a received timestamp 608 by filtering the received timestamp 608 via the recursive filter logic 604. The recursive filter logic 604 is configured to reduce jitter (not shown) of the received timestamp 608. The jitter represents a deviation from a target (ideal) timestamp (not shown), such as disclosed above with regard to FIG. 3A and FIG. 3B. The circuit 602 is further configured to output the filtered timestamp 606 generated. The filtered timestamp 606 generated and output is a more accurate representation of the target timestamp relative to the received timestamp 608 based on the jitter reduced.

The jitter of the received timestamp 608 may have a maximum value (not shown) and an average value (not shown) and the recursive filter logic 604 may be further configured to reduce the maximum value of the jitter, average value of the jitter, or a combination thereof.

The circuit 602 may include a plurality of flip-flops (FFs), such as the flip-flop (FF) 612a, FF 612b, . . . , and FF 612j. It should be understood that the circuit 602 may include more or less FFs than shown in FIG. 6. The plurality of FFs may be clocked via a clock (not shown) input to the circuit 602 and may be reset via a filter reset signal 679. The recursive filter logic 604 may include filter-step control logic 654 configured to generate a filter step value 650, referred to interchangeably herein as "k," based on a clock cycle of the clock. The filter-step control logic 654 may be reset via the filter reset signal 679 and may be configured to increment a value 652 for the filter step value 650 (i.e., k) based on a clock cycle of the clock. The filter step value 650 (i.e., k) may be produced by sampling the value 652 via a FF 612e for non-limiting example.

According to an example embodiment, the filter-step control logic 652 may be configured to increment the filter step value 650 in response to a rising edge or falling edge of the clock and, in an event the filter step value 650 reaches an upper limit (cap, threshold), the filter-step control logic 652 may be configured to stop incrementing the filter step value 650 and to maintain the filter step value 650 at the upper limit (not shown). The upper limit may be sixteen for non-limiting example, as described further below. The filter-step control logic 654 may reset the filter step value 650 responsive to a change in state (e.g., rising edge or falling edge) of the filter reset signal 679 and increment the filter step value 650 in response to a rising edge or falling edge of the clock following same.

According to an example embodiment, the circuit 602 may further comprise output-timestamp selection logic 675 configured to select between the received timestamp 608 and the filtered timestamp 606 generated and output. The output-timestamp selection logic 675 may be configured to output a selected timestamp 678 based on such selection. The output-timestamp selection logic 675 may, for non-limiting example, include an output multiplexer 677 configured to perform the selection based on an enable signal 676 input to the output multiplexer 677.

The enable signal 676 may be driven by a controller (not shown) for non-limiting example. The controller may drive the enable signal 676 based on a run-time mode of the circuit 602 for non-limiting example. For example, in the run-time mode of the circuit 602, the enable signal 676 may be configured by the controller to cause the output multiplexer 677 to select the filtered timestamp 606 as the selected timestamp 678. In a debug mode of the circuit 602, the enable signal 676 may be configured by the controller to cause the output multiplexer 677 to select the received timestamp 608 as the selected timestamp 678.

The selected timestamp 678 may be output to a different circuit (not shown) that may, for non-limiting example, be configured to timestamp packets based on same. Such timestamping may, for non-limiting example, include inserting the selected timestamp 678 in a field of a packet or appending the selected timestamp 678 to the packet. It should be understood that such selection via the enable signal 676 is for non-limiting example and that the output-timestamp selection logic 675 is optional. For example, the circuit 602 may be configured to output the filtered timestamp 606 directly to the different circuit that may, for non-limiting example, be configured to timestamp packets based on the filtered timestamp 606. As such, the circuit 602 may be configured to output the filtered timestamp 606 to a timestamp consumer (not shown) that may, in turn, be configured to associate an incoming packet, outgoing packet, or combination thereof, with the filtered timestamp 606 generated and output from the circuit 602.

Within the context of the circuit 602, the received timestamp 608 may be referred to interchangeably herein as $X_{k+2}^*$, and may represent the received timestamp 608 at k+2, that is, at two clock cycles after which a current value of the filter step value 650 (i.e., k) is generated. The received timestamp 608 may be a synchronized timestamp received from a synchronizer, such as the TS synchronizer circuit 221 of FIG. 2, disclosed above for non-limiting example, and, thus, may have jitter present due to synchronization performed by the TS synchronizer circuit 221, as disclosed above.

Continuing with reference to FIG. 6, the received timestamp 608 may be sampled by the FF 612a based on the clock to produce a sampled version 609 of the received timestamp 608. The received timestamp 608 may be received in an original timestamp format (not shown) and the circuit 602 may further comprise input format-conversion logic 614. The input format-conversion logic 614 may be configured to convert the received timestamp 608, in the original timestamp format, to an intermediate version 611 of the received timestamp 608, in an intermediate timestamp format (not shown). Such conversion may be based on an input conversion value 613. According to an example embodiment, the original timestamp format may be based on seconds and nanoseconds and the intermediate timestamp format may be based on seconds and fractional seconds, as disclosed further below.

For non-limiting example, the input format-conversion logic 614 may include a multiplier configured to multiply the sampled version 609 of the received timestamp 608, in the original timestamp format, by the input conversion value 613 to produce the intermediate version 611 of the received timestamp 608 in the intermediate timestamp format, as disclosed further below. The intermediate version 611 of the received timestamp 608 may be sampled by the FF 612b to produce a current timestamp value 616 of the received timestamp 608. The current timestamp value 616 may be referred to interchangeably herein as $X_k^*$, disclosed above with regard to equations (3) through (5), and may represent the received timestamp 608 in the intermediate timestamp format, at the filter step value 650 (i.e., k). The current timestamp value 616 (i.e., $X_k^*$) of the received timestamp 608 may be input to the recursive filter logic 604.

The recursive filter logic 604 may be further configured to implement a recursive least-squares (RLS) filter 610, disclosed above with regard to equations (1) through (5). The RLS filter 610 may be configured to generate a current estimated timestamp value 638 (i.e., $\hat{X}_k$) of the target (ideal) timestamp by generating a current estimated line slope value 637 (i.e., $\dot{\hat{X}}_k$) of a line slope of a linear function (not shown) based on the current timestamp value 616 (i.e., $X_k^*$) of the received timestamp 608. The current estimated timestamp value 638 and estimated line slope 637 may be referred to interchangeably herein as $\hat{X}_k$ and $\dot{\hat{X}}_k$, respectively. The linear function may represent the target (ideal) timestamp, as disclosed above with regard to FIG. 3A, FIG. 3B, and FIG. 4.

Continuing with reference to FIG. 6, the current estimated timestamp value 638 (i.e., $\hat{X}_k$) may be sampled by a FF 612c to produce a previous estimated timestamp value 636 (i.e., $\hat{X}_{k-1}$) and the current estimated line slope value 637 (i.e., $\dot{\hat{X}}_k$) may be sampled by a FF 612d to produce a previous estimated line slope value 646 (i.e., $\dot{\hat{X}}_{k-1}$). The circuit 602 may be further configured to generate the filtered timestamp 606 based on the current estimated timestamp value 638 (i.e., $\hat{X}_k$) generated, as disclosed further below. To implement the RLS filter 610 and generate the current estimated timestamp value 638 (i.e., $\hat{X}_k$), the recursive filter logic 604 may be configured to implement equations (3) through (5), disclosed above, optionally based on optimizations, disclosed further below for non-limiting example.

Based on equations (3) through (5), disclosed above, the RLS filter 610 may be configured to generate a current estimated timestamp value 638 (i.e., $\hat{X}_k$) of the target timestamp and generate a current estimated line slope value 637 of a line slope of a linear function, the linear function representing the target timestamp. The current estimated timestamp value 638 may be generated based on a previous estimated timestamp value 636 (i.e., $\hat{X}_{k-1}$) of the target timestamp and a previous estimated line slope value 646 (i.e., $\hat{\dot{X}}_{k-1}$) of the line slope of the linear function. The previous estimated timestamp value 636 (i.e., $\hat{X}_{k-1}$) and previous estimated line slope value 646 (i.e., $\hat{\dot{X}}_{k-1}$) may be generated by the RLS filter 610 prior to generation of the current estimated timestamp value 638 (i.e., $\hat{X}_k$) and current estimated line slope value 637 (i.e., $\hat{\dot{X}}_k$), respectively.

The previous estimated timestamp value 636 (i.e., $\hat{X}_{k-1}$) and the previous estimated line slope value 646 (i.e., $\hat{\dot{X}}_{k-1}$) may be generated by the RLS filter 610 in a previous clock cycle (e.g., k−1) and the previous clock cycle (e.g., k−1) may immediately precede a current clock cycle (e.g., k) in which the current estimated timestamp value 638 (i.e., $\hat{X}_k$) and current estimated line slope value 637 (i.e., $\hat{\dot{X}}_k$) are generated.

According to an example embodiment, the received timestamp 608 may be received on the cycle-by-cycle basis. The RLS filter 610 may be configured to generate an estimated timestamp value of the target timestamp, namely the current estimated timestamp value 638 (i.e., $\hat{X}_k$) which is an estimate of the target timestamp, on the cycle-by-cycle basis, and the circuit 602 may be further configured to generate the filtered timestamp 606 on the cycle-by-cycle basis, based on the estimated timestamp value generated, that is, the current estimated timestamp value 638 (i.e., $\hat{X}_k$).

To implement the RLS filter 610, the recursive filter logic 604 may include received-timestamp filter gain logic 621, estimated-timestamp filter gain logic 623, and estimated-line-slope filter gain logic 625, as disclosed below.

The received-timestamp filter gain logic 621 may be configured to produce a first filter-gain-received-timestamp product 630-1 (i.e., $K_{1_k}X_k^*$) and a second filter-gain-received-timestamp product 630-2 (i.e., $K_{2_k}X_k^*$). The received-timestamp filter gain logic 621 may be configured to produce the first filter-gain-received-timestamp product 630-1 (i.e., $K_{1_k}X_k^*$) by multiplying at least a portion of the current timestamp value 616 (i.e., $X_k^*$) with a first filter gain value (i.e., $K_{1_k}$) (not shown), wherein the first filter gain value is in accordance with equation (1), disclosed above, and based on the filter step value 650. It should be understood that k, namely the filter step value 650 is not limited to starting with a value of 1, as indicated with regard to equation (1) and may, for non-limiting example start with a value of 0.

In the example embodiment of FIG. 6, the received-timestamp filter gain logic 621 may be further configured to produce the second filter-gain-received-timestamp product 630-2 by multiplying the at least a portion of the current timestamp value 616 (i.e., $X_k^*$) with a second filter gain value (i.e., $K_{2_k}$) (not shown), wherein the second filter gain value is in accordance with equation (2), disclosed above, and based on the filter step value 650.

For non-limiting example, the at least a portion of the current timestamp value 616 (i.e., $X_k^*$) may be a least-significant bit (LSB) portion 618 of the current timestamp value 616 (i.e., $X_k^*$), wherein the LSB portion 618 is of lesser significance relative to a most-significant bit (MSB) portion 619 of the current timestamp value 616 (i.e., $X_k^*$). The at least a portion of the current timestamp value 616 (i.e., $X_k^*$) may be the least-significant bit (LSB) portion 618 to optimize the circuit 602, as disclosed further below.

According to an example embodiment, the received-timestamp filter gain logic 621 may include a first received-timestamp multiplexer 626a. The received-timestamp filter gain logic 621 may be configured to multiply the at least a portion of the current timestamp value 616 (i.e., $X_k^*$) by a plurality of first filter gain values (not shown) to produce a plurality 620 of first filter-gain-received-timestamp products that may be input to the first received-timestamp multiplexer 626a.

Each first filter-gain-received-timestamp product of the plurality 620 of first filter-gain-received-timestamp products corresponds to the at least a portion of the current timestamp value 616 (i.e., $X_k^*$) multiplied by a respective first filter gain value of the plurality of first filter gain values. To multiply the at least a portion of the current timestamp value 616 (i.e., $X_k^*$) by each respective first filter gain value, the received-timestamp filter gain logic 621 may, for non-limiting example, be configured to shift the at least a portion of the current timestamp value 616 (i.e., $X_k^*$) by each respective first filter gain value of the plurality of first filter gain values.

For example, the plurality of first filter gain values may include sixteen first filter gain values for $K_1$ with the following values for K 1 corresponding to k=0, . . . , 15 for non-limiting examples: k=0,1→$K_1$=1; k=2 . . . 5→$K_1$=0.5; k=6 . . . 13→$K_1$=0.25; and k=14,15→$K_1$=0.125. The first and second inputs of to the first received-timestamp multiplexer 626a (corresponding to a select=k=0,1) would both be equal to bits [N−1:0]; the next four inputs (corresponding to k=2 . . . 5) would all be equal to [N−1:1] (shift right by one, corresponding to *0.5), the next eight inputs would be [N−1:2], and the last two would be [N−1:3], such inputs representing the plurality 620 of first filter-gain-received-timestamp products for non-limiting example.

The first received-timestamp multiplexer 626a may be configured to select the first filter-gain-received-timestamp product 630-1 (i.e., $K_{1_k}X_k^*$) from the plurality 620 of first filter-gain-received-timestamp products based on the filter step value 650 (i.e., k) and may output the first filter-gain-received-timestamp product 630-1 (i.e., $K_{1_k}X_k^*$) selected to an estimated-timestamp producer 634.

The estimated-timestamp producer 634 may be configured to produce the current estimated timestamp value 638 (i.e., $\hat{X}_k$) by combining the first filter-gain-received-timestamp product 630-1 (i.e., $K_{1_k}X_k^*$) with a previous estimated timestamp value 636 (i.e., $\hat{X}_{k-1}$), a first filter-gain-previous-estimated-timestamp product 644-1 (i.e., $K_{1_k}\hat{X}_{k-1}$), a previous estimated line slope value 646 (i.e., $\hat{\dot{X}}_{k-1}$), and a first filter-gain-previous-estimated-line-slope product 648-1 (i.e., $K_{1_k}\hat{\dot{X}}_{k-1}$). The first filter-gain-previous-estimated-line-slope product 648-1 (i.e., $K_{1_k}\hat{\dot{X}}_{k-1}$) may be produced via the estimated-line-slope filter gain logic 625, as disclosed further below.

According to an example embodiment, the estimated-timestamp producer 634 may be configured to produce the current estimated timestamp value 638 (i.e., $\hat{X}_k$) by adding (i) the previous estimated timestamp value 636 (i.e., $\hat{X}_{k-1}$), (ii) the previous estimated line slope value 646 (i.e., $\hat{\dot{X}}_{k-1}$) multiplied by a number of cycles $T_s$ since a last timestamp update of the received timestamp 608, and (iii) the first filter-gain-received-timestamp product 630-1 (i.e., $K_{1_k}X_k^*$), and subtracting (iv) the first filter-gain-previous-estimated-timestamp product 644-1 (i.e., $K_{1_k}\hat{X}_{k-1}$) and (v) the first filter-gain-previous-estimated-line-slope product 648-1 (i.e., $K_{1_k}\hat{\dot{X}}_{k-1}$) multiplied by the number of cycles $T_s$, as disclosed above with regard to equations (3) through (5). According to an example embodiment, the number of cycles $T_s$ may be one. In accordance with equation (4), above, the RLS filter 610 may be further configured to generate the current estimated timestamp value 638 (i.e., $\hat{X}_k$) based on a product of the previous estimated timestamp value 636 (i.e., $\hat{X}_{k-1}$) and a number of clock cycles that transpired since a last update of the received timestamp 608.

The received-timestamp filter gain logic 621 may further include a second received-timestamp multiplexer 628a. The received-timestamp filter gain logic 621 may be configured to multiply the at least a portion of the current timestamp value 616 (i.e., $X_k^*$) by a plurality of second filter gain values (not shown) to produce a plurality (not shown) of second filter-gain-received-timestamp products input to the second received-timestamp multiplexer 628a.

Each second filter-gain-received-timestamp product of the plurality of second filter-gain-received-timestamp products may represent the at least a portion of the current timestamp value 616 (i.e., $X_k^*$) multiplied by a respective second filter gain value of the plurality of second filter gain values. To multiply the at least a portion of the current timestamp value 616 (i.e., $X_k^*$) by each respective second filter gain value, the received-timestamp filter gain logic 621 may, for non-limiting example, be configured to shift the at least a portion of the current timestamp value 616 (i.e., $X_k^*$) by each respective second filter gain value.

The second received-timestamp multiplexer 628a may be configured to select the second filter-gain-received-timestamp product 630-2 (i.e., $K_{2_k} X_k^*$) from the plurality of second filter-gain-received-timestamp products and output the second filter-gain-received-timestamp product 630-2 (i.e., $K_{2_k} X_k^*$) to an estimated-line-slope producer 635, as disclosed further below. The second received-timestamp multiplexer 628a may be configured to select the second filter-gain-received-timestamp product 630-2 (i.e., $K_{2_k} X_k^*$) from the plurality of second filter-gain-received-timestamp products based on the filter step value 650 (i.e., k).

As disclosed above, the estimated-timestamp producer 634 may be configured to produce the current estimated timestamp value 638 (i.e., $\hat{X}_k$) based on the first filter-gain-previous-estimated-timestamp product 644-1 (i.e., $K_{1_k}\hat{X}_{k-1}$). The estimated-timestamp filter gain logic 623 may be configured to produce the first filter-gain-estimated-timestamp product 644-1 (i.e., $K_{1_k}\hat{X}_{k-1}$), input to the estimated-timestamp producer 634, as disclosed above, and may be further configured to produce a second filter-gain-estimated-timestamp product 644-2 (i.e., $K_{2_k}\hat{X}_{k-1}$).

The estimated-timestamp filter gain logic 623 may be configured to produce the first filter-gain-estimated-timestamp product 644-1 (i.e., $K_{1_k}\hat{X}_{k-1}$) by multiplying the previous estimated timestamp value 636 (i.e., $\hat{X}_{k-1}^*$) with the first filter gain value (i.e., $K_{1_k}$) of the plurality of first filter gain values. The estimated-timestamp filter gain logic 623 may be further configured to produce the second filter-gain-estimated-timestamp product 644-2 (i.e., $K_{2_k}\hat{X}_{k-1}$) by multiplying the previous estimated timestamp value 636 (i.e., $\hat{X}_{k-1}^*$) with the second filter gain value (i.e., $K_{2_k}$) of the plurality of second filter gain values.

According to an example embodiment, the estimated-timestamp filter gain logic 623 may include a first estimated-timestamp multiplexer 626b. The estimated-timestamp filter gain logic 623 may be configured to multiply the previous estimated timestamp value 636 (i.e., $\hat{X}_{k-1}^*$) by each first filter gain value of the plurality of first filter gain values to produce a plurality 622 of first filter-gain-previous-estimated-timestamp products that may be input to the first estimated-timestamp multiplexer 626b.

Each first filter-gain-estimated-timestamp product of the plurality 622 of first filter-gain-estimated-timestamp products corresponds to the previous estimated timestamp value 636 (i.e., $\hat{X}_{k-1}^*$) multiplied by a respective first filter gain value of the plurality of first filter gain values. To multiply the previous estimated timestamp value 636 (i.e., $\hat{X}_{k-1}^*$) by each respective first filter gain value, the estimated-timestamp filter gain logic 623 may, for non-limiting example, be configured to shift the previous estimated timestamp value 636 (i.e., $\hat{X}_{k-1}^*$) by each respective first filter gain value of the plurality of first filter gain values.

The first estimated-timestamp multiplexer 626b may be configured to select the first filter-gain-estimated-timestamp product 644-1 (i.e., $K_{1_k}\hat{X}_{k-1}$) from the plurality 622 of first filter-gain-estimated-timestamp products based on the filter step value 650 (i.e., k) and may output the first filter-gain-estimated-timestamp product 644-1 (i.e., $K_{1_k}\hat{X}_{k-1}$) selected to the estimated-timestamp producer 634, disclosed above.

The estimated-timestamp filter gain logic 623 may further include a second estimated-timestamp multiplexer 628b. The estimated-timestamp filter gain logic 623 may be further configured to multiply the previous estimated timestamp value 636 (i.e., $\hat{X}_{k-1}^*$) by each second filter gain value of the plurality of second filter gain values to produce a plurality (not shown) of second filter-gain-estimated-timestamp products input to the second estimated-timestamp multiplexer 626b.

Each second filter-gain-estimated-timestamp product of the plurality of second filter-gain-estimated-timestamp products may represent the previous estimated timestamp value 636 (i.e., $\hat{X}_{k-1}^*$) multiplied by a respective second filter gain value of the plurality of second filter gain values. To multiply the previous estimated timestamp value 636 (i.e., $\hat{X}_{k-1}^*$) by each respective second filter gain value, the estimated-timestamp filter gain logic 623 may, for non-limiting example, be configured to shift the previous estimated timestamp value 636 (i.e., $\hat{X}_{k-1}^*$) by each respective second filter gain value.

The second estimated-timestamp multiplexer 628b may be configured to select the second filter-gain-estimated-timestamp product 644-2 (i.e., $K_{2_k}\hat{X}_{k-1}$) from the plurality of second filter-gain-estimate-timestamp products and output the second filter-gain-estimated-timestamp product 644-2 (i.e., $K_{2_k}\hat{X}_{k-1}$) to the estimated-line-slope producer 635. The second estimated-timestamp multiplexer 628b may be configured to select the second filter-gain-estimated-timestamp product 644-2 (i.e., $K_{2_k}\hat{X}_{k-1}$) from the plurality of second filter-gain-estimated-timestamp products based on the filter step value 650 (i.e., k).

The estimated-line-slope producer 635 may be configured to produce the current estimated line slope value 637 (i.e., $\hat{\dot{X}}_k$) by combining the second filter-gain-received-timestamp product 630-2 (i.e., $K_{2_k} X_k^*$), the second filter-gain-estimated-timestamp product 644-2 (i.e., $K_{2_k}\hat{X}_{k-1}$), the previous estimated line slope value 646 (i.e., $\hat{\dot{X}}_{k-1}$), and a second filter-gain-estimated-line-slope product 648-2 (i.e., $K_{2_k}\hat{\dot{X}}_{k-1}$). The second filter-gain-estimated-line-slope product 648-2 (i.e., $K_{2_k}\hat{\dot{X}}_{k-1}$) may be produced via the estimated-line-slope filter gain logic 625, as disclosed further below.

According to an example embodiment, the estimated-line-slope producer 635 may be configured to produce the current estimated line slope value 637 (i.e., $\hat{\dot{X}}_k$) by adding (i) the previous estimated line slope value 646 (i.e., $\hat{\dot{X}}_{k-1}$) and (ii) the second filter-gain-received-timestamp product 630-2 (i.e., $K_{2_k} X_k^*$) and subtracting (iii) the second filter-gain-estimated-timestamp product 644-2 (i.e., $K_{2_k}\hat{X}_{k-1}$) and (iv) second filter-gain-estimated-line-slope product 648-2 (i.e., $K_{2_k}\hat{X}_{k-1}$), multiplied by a number of cycles $T_s$ since a last timestamp update of the received timestamp 608, as disclosed above with regard to equations (3) through (5). According to an example embodiment, the number of cycles $T_s$ may be one. The second filter-gain-estimated-line-slope product 648-2 (i.e., $K_{2_k}\hat{X}_{k-1}$) may be produced via the estimated-line-slope filter gain logic 625, as disclosed below.

The estimated-line-slope filter gain logic 625 may be configured to produce the first filter-gain-estimated-line-slope product 648-1 (i.e., $K_{1_k}\hat{X}_{k-1}$) and the second filter-gain-estimated-line-slope product 648-2 (i.e., $K_{2_k}\hat{X}_{k-1}$) that are input to the estimated-timestamp producer 634 and estimated-line-slope producer 635, respectively, as disclosed above.

The estimated-line-slope filter gain logic 625 may be further configured to produce the first filter-gain-estimated-line-slope product 648-1 (i.e., $K_{1_k}\hat{X}_{k-1}$) by multiplying the previous estimated line slope value 646 (i.e., $\hat{X}_{k-1}$) with the first filter gain value (i.e., $K_{1_k}$) of the plurality of first filter gain values.

The estimated-line-slope filter gain logic 625 may be further configured to produce the second filter-gain-estimated-line-slope product 648-2 (i.e., $K_{2_k}\hat{X}_{k-1}$) by multiplying the previous estimated line slope value 646 (i.e., $\hat{X}_{k-1}$) with the second filter gain value (i.e., $K_{2_k}$) of the plurality of second filter gain values.

According to an example embodiment, the estimated-line-slope filter gain logic 625 may include a first estimated-line-slope multiplexer 626c. The estimated-line-slope filter gain logic 625 may be further configured to multiply the previous estimated line slope value 646 (i.e., $\hat{X}_{k-1}$) by each first filter gain value of the plurality of first filter gain values to produce a plurality 624 of first filter-gain-estimated-line-slope products that may be input to the first estimated-line-slope multiplexer 626a.

Each first filter-gain-estimated-line-slope product of the plurality 624 of first filter-gain-estimated-line-slope products corresponds to the previous estimated line slope value 646 (i.e., $\hat{X}_{k-1}$) multiplied by a respective first filter gain value of the plurality of first filter gain values. To multiply the previous estimated line slope value 646 (i.e., $\hat{X}_{k-1}$) by each respective first filter gain value, the estimated-line-slope filter gain logic 625 may, for non-limiting example, be configured to shift the previous estimated line slope value 646 (i.e., $\hat{X}_{k-1}$) by each respective first filter gain value of the plurality of first filter gain values.

The first estimated-line-slope multiplexer 626c may be configured to select the first filter-gain-estimated-line-slope product 648-1 (i.e., $K_{1_k}\hat{X}k_{-1}$) from the plurality 624 of first filter-gain-estimated-line-slope products based on the filter step value 650 (i.e k) and may output the first filter-gain-estimated-line-slope product 648-1 (i.e., $K_{1_k}\hat{X}_{k-1}$) selected to the estimated-timestamp producer 634 disclosed above.

The estimated-line-slope filter gain logic 625 may further include a second estimated-line-slope multiplexer 628c. The estimated-line-slope filter gain logic 625 may be configured to multiply the previous estimated line slope value 646 (i.e., $\hat{X}_{k-1}$) by each second filter gain value of the plurality of second filter gain values to produce a plurality (not shown) of second filter-gain-estimated-line-slope products input to the second estimated-line-slope multiplexer 626c.

Each second filter-gain-estimated-line-slope product of the plurality of second filter-gain-estimated-line-slope products may represent the previous estimated line slope value 646 (i.e., $\hat{X}_{k-1}$) multiplied by a respective second filter gain value of the plurality of second filter gain values. To multiply the previous estimated line slope value 646 (i.e., $\hat{X}_{k-1}$) by each respective second filter gain value, the estimated-line-slope filter gain logic 625 may, for non-limiting example, be configured to shift the previous estimated line slope value 646 (i.e., $\hat{X}_{k-1}$) by each respective second filter gain value.

The second estimated-line-slope multiplexer 628c may be configured to select the second filter-gain-estimated-line-slope product 648-2 (i.e., $K_{2_k}\hat{X}_{k-1}$) from the plurality of second filter-gain-estimate-line-slope products and output the second filter-gain-estimated-line-slope product 648-2 (i.e., $K_{2_k}\hat{X}_{k-1}$) to the estimated-line-slope producer 635. The second estimated-line-slope multiplexer 628c may be configured to select the second filter-gain-estimated-line-slope product 648-2 (i.e., $K_{2_k}\hat{X}_{k-1}$) from the plurality of second filter-gain-estimated-line-slope products based on the filter step value 650 (i.e., k). The second filter-gain-estimated-line-slope product 648-2 (i.e., $K_{2_k}\hat{X}_{k-1}$) may be input to the estimated-line-slope producer 635 for generating the current estimated line slope value 637 (i.e., $\hat{X}_k$), as disclosed above.

As disclosed above, the previous estimated line slope value 637 (i.e., $\hat{X}_{k-1}$) may be used by the estimated-timestamp producer 634 to produce the current estimated timestamp value 638 (i.e., $\hat{X}_k$) produced by the RLS filter 610. The filtered timestamp 606 may be generated based on the current estimated timestamp value 638 (i.e., $\hat{X}_k$) as disclosed below.

According to an example embodiment, the at least a portion of the current timestamp value 616 (i.e., $X_k^*$) input to the RLS filter 610 may be the least-significant bit (LSB) portion 618 of the current timestamp value 616, namely 'N' least significant bits (LSBs) of a total number of bits of the current timestamp value 616 (i.e., $X_k^*$), which may be in the intermediate timestamp format based on the input format-conversion logic 614 disclosed above and further below.

In an event the at least a portion of the current timestamp value 616 (i.e., $X_k^*$) input to the RLS filter 610 is 'N' bits, the first filter-gain-received-timestamp product 630-1 (i.e., $K_{1_k}X_k^*$), second filter-gain-received-timestamp product 630-2 (i.e., $K_{2_k}X_k^*$), first filter-gain-previous-estimated-timestamp product 644-1 (i.e., $K_{1_k}\hat{X}_{k-1}$), second filter-gain-estimated-timestamp product 644-2 (i.e., $K_{2_k}\hat{X}_{k-1}$), first filter-gain-previous-estimated-line-slope product 648-1 (i.e., $K_{1_k}\hat{X}_{k-1}$), second filter-gain-estimated-line-slope product 648-2 (i.e., $K_{2_k}\hat{X}_{k-1}$), previous estimated line slope value 646 (i.e., $\hat{X}_{k-1}$), current estimated line slope value 637 (i.e., $\hat{X}_k$), previous estimated timestamp value 636 (i.e., $\hat{X}_{k-1}$), and current estimated timestamp value 638 (i.e., $\hat{X}_k$), each have a total number of bits that is 'N' bits.

According to an example embodiment, the recursive filter logic 604 may further include rollover detection logic 670 and timestamp adjustment logic 666. The rollover detection logic 670 may be configured to produce a rollover detection signal 660 based on the LSB portion 618 of the current timestamp value 616 (i.e., $X_k^*$) and the current estimated timestamp value 638 (i.e., $\hat{X}_k$), as disclosed further below. The rollover detection signal 660 may be sampled by the FF 612g to produce a sampled version 661 of the rollover detection signal 660. The rollover detection logic 670 and timestamp adjustment logic 666 may be coupled within the circuit 602 and the sampled version 661 of the rollover detection signal 660 may be input to the timestamp adjustment logic 666 and employed by the timestamp adjustment logic 666 as disclosed below.

The timestamp adjustment logic 666 may be configured to produce a filtered timestamp value 668 having a total number of bits of the current timestamp value 616 (i.e., $X_k^*$). The filtered timestamp value 668 may be based on the current estimated timestamp value 638 (i.e., $\hat{X}_k$) and the MSB portion 619 of the current timestamp value 616 (i.e., $X_k^*$), as disclosed further below. The MSB portion 619 may be sampled by the FF 612f to produce a sampled version 662 of the MSB portion 619. The current estimated timestamp value 638 (i.e., $\hat{X}_k$) may be sampled by the FF 612h to produce a sampled version 664 of the current estimated timestamp value 638 (i.e., $\hat{X}_k$).

The timestamp adjustment logic 666 may be further configured to produce the filtered timestamp value 668 based on the sampled version 662 of the MSB portion 619 of the current timestamp value 616 (i.e., $X_k^*$), sampled version 664 of the current estimated timestamp value 638 (i.e., $\hat{X}_k$), and sampled version 661 of the rollover detection signal 660, as disclosed further below.

The filtered timestamp value 668 may be in the intermediate timestamp format and may be sampled by the FF 612i to produce a sampled version 671 of the filtered timestamp value 668. The circuit 602 may further comprise output format-conversion logic 672 configured to convert the sampled version 671 of the filtered timestamp value 668, in the intermediate timestamp format, to a sampled version 674 of the filtered timestamp value 668 in the original timestamp format, as disclosed further below. The sampled version 674 of the filtered timestamp value 668, in the original timestamp format, may be sampled via the FF 612j to generate the filtered timestamp 606 that is generated and output by the circuit 602 in the original timestamp format.

According to an example embodiment, the circuit 602 may further comprise reset logic 667. The reset logic 667 may be configured to assert (activate) the filter reset signal 679 based on the current timestamp value 616 (i.e., $X_k^*$), in the intermediate timestamp format, and the sampled version 671 of the filtered timestamp value 668, in the intermediate timestamp format. The filter reset signal 679 may represent an error signal that is asserted, for non-limiting example, based on an absolute difference (not shown) between the current timestamp value 616 (i.e., $X_k^*$), in the intermediate timestamp format, and the sampled version 671 of the filtered timestamp value 668, in the intermediate timestamp format, as disclosed in detail further below.

Assertion of the filter reset signal 679 may be represented as an active low state of the filter reset signal 679, active high state of the filter reset signal 679, or change in state of the filter reset signal 679 for non-limiting examples. The filter reset signal 679 is not limited to being asserted based on the absolute difference and may, for non-limiting example, be asserted based on an input reset control signal (not shown) driven by a processor (not shown) in response to an instruction(s) executed by the processor and/or based on a reset of a chip (not shown) that incorporates the circuit 602.

According to an example embodiment, the filter reset signal 679 may be asserted based on the absolute difference such that the circuit 602 is reset in an event the residual error of the RLS filter 610, namely $Res_k$, disclosed above with regard to equation (3), exceeds an error threshold. The reset logic 667 may be configured to reset the recursive filter logic 604, automatically, based on the residual error Res k computed, thereby resetting the RLS filter 610.

As disclosed above, the recursive filter logic 604 may be configured to produce the current estimated line slope value 637 (i.e., $\hat{X}_k$) and the current estimated timestamp value 638 (i.e., $\hat{X}_k$) based on equations (1) through (5), disclosed above. According to an example embodiment, several optimizations and simplifications to the above-noted equations may be employed for non-limiting example. For example, $T_s$ may be set to one, reflecting an update of the received timestamp 608 on every clock cycle, according to an example embodiment. According to another example embodiment, a value for k, that is, the filter step value 650, may be capped (limited) such that k does not increment above an upper threshold value, such as sixteen for non-limiting example.

According to an example embodiment, the value for k may be capped at the upper threshold at which it is determined that the first gain $K_{1_k}$ and second gain $K_{2_k}$, disclosed in equations (1) and (2), above, respectively, are small enough to be deemed negligible. For example, if the RLS filter 610 was able to lock onto the target (ideal, correct) timestamp with k at the capped value, it is understood that it will remain locked. For example, with k at the capped value, the RLS filter 610 may continue to track the straight line of the target (ideal, correct) timestamp over time even though k is no longer updating over time. Limiting k such that a value of same does not increment above an upper threshold value enables hardware logic of the circuit 602 to be simplified.

According to another example embodiment, values for the first gain $K_{1_k}$ and second gain $K_{2_k}$ may be rounded down to the nearest power-of-2 fraction. Such rounding may cause slightly slower convergence (a few cycles), but significantly simplifies the hardware implementation of the circuit 602. For non-limiting example, a timestamp format handled within the circuit 602 may be a format that contains 32-bit seconds and 32-bit nanoseconds ($<10^9$). It should be understood, however, that the timestamp format handled by the circuit 602 is not limited to such format. According to an example embodiment, an original timestamp format of the received timestamp 608 may, for non-limiting example, be converted internally, that is, internal to the circuit 602, to an intermediate timestamp format of 32-bit seconds, 32-bit fractional seconds, to ease rollover (wrap-around) handling, and the output-format conversion logic 672 may be employed for timestamp format conversion such that the filtered timestamp 606 is output in the original timestamp format, as disclosed above and further below.

Rollover Detection and Timestamp Format Conversion

Continuing with reference to FIG. 6, according to an example embodiment, a timestamp format for the received/synchronized timestamp, that is, the received timestamp 608, may be 64 bits, composed of 32-bit seconds and 32-bit nanoseconds (the nanoseconds part takes values from 0 to $10^9-1$; 0x00000000 to 0x3B9AC9FF in hexadecimal). It should be understood, however, that the timestamp format for the received timestamp 608 is not limited thereto. Further, while the following disclosure related to rollover (wrap-around) and timestamp format conversion may be explained with regard to a 64-bit format, it should be appreciated that such disclosure is not limited thereto and that the concepts with respect to same may be extended to other formats.

The original equations, that is, equations (3)-(5), disclosed above, assume that $X_k^*$, that is, the current timestamp value 616 of the received timestamp 608, changes smoothly. Absent additional special logic disclosed above and below with regard to FIG. 6, a hardware implementation of the RLS filter 610 would not "understand" that a difference between consecutive inputs of, for non-limiting example, 0x000000013B9AC9FF (i.e., 1 s, 10^9-1 ns) and 0x0000000200000000 (i.e., 2 s, 0 ns), is just one nanosecond. To the RLS filter 610, such difference would look like a 0xC4653601 difference (i.e., over 3 billion ns) and, thus, the RLS filter 610 would attempt to (incorrectly) adjust its estimation to match this. This huge difference (i.e., over 3 billion ns) would occur every time the seconds part is incremented; or in other words, when the nanoseconds roll over.

Logic to handle this rollover is relatively complicated and increases the area and power consumption of the implementation. A more efficient solution disclosed herein with regard to FIG. 6 is to convert the received timestamp 608 into a different format, namely an intermediate timestamp format, that has small, bounded increments over the entire range of input values. Such an intermediate timestamp format is advantageously employed in the example embodiment of the circuit 602 of FIG. 6. It should be understood, however, that the circuit 602 is not limited to employing same and that input/output format conversion performed by the circuit 602 is optional.

A non-limiting example of such an intermediate timestamp format is 32-bit seconds and 32-bit fractional seconds (which represents a binary fraction of the form M/2^32, where M represents a value of the fractional seconds part of the received timestamp 608). To convert to this intermediate timestamp format, the nanosecond part may be multiplied by 2^32/10^9 (~4.295). As such, the input-timestamp format-conversion logic 614 of the circuit 602 include a multiplier configured to multiply the multiplicand, that is, the sampled version 609 of the received timestamp 608, by the input conversion value 613, that is, ~4.295 for non-limiting example. Thus, in an event the received timestamp 608 has a value of 0x000000013B9AC9FF (i.e., 1 sec, 10^9-1 ns), such value would be converted by the input format-conversion logic 614 into 0x00000001FFFFFFFB (i.e., 1+0xFFFFFFFB/2^32 sec; equivalent to 1 sec and 999,999, 999 ns). The difference from 0x0000000200000000 (2 sec, 0/2^32=0 ns) is then only 0x0000000000000004.

The RLS filter 610 may, advantageously, work on this smoothly incrementing 64-bit input value. The filter's estimated output $\hat{X}_k$, that is, the current estimated timestamp value 638, may be used for generating the filtered timestamp 606 in the original timestamp format, that is, "sec, ns" for non-limiting example, based on timestamp format conversion performed by the output format-conversion logic 672 of the circuit 602. The conversion may be performed by the output-timestamp format-conversion logic 672 before the circuit 602 transmits the filtered timestamp 606 to a timestamp consumer(s) (not shown).

In the non-limiting example embodiment of FIG. 6, the output-timestamp format-conversion logic 672 is a multiplier configured to multiply the multiplicand, that is, the sampled version 671 of the filtered timestamp value 668 in the intermediate timestamp format, by an output conversion value 673, namely 10^9/2^32, such that the output-timestamp format-conversion logic 672 multiplies the fractional seconds by 10^9/2^32 to convert the sampled version 671 of the filtered timestamp value 668, in the intermediate timestamp format, to the sampled version 674 of the filtered timestamp value 668, in the original timestamp format, this is, in turn sampled by the FF 612j to produce the filtered timestamp 606 that is output by the circuit 602 in the original timestamp format. Such timestamp format conversion enables an additional optimization in the circuit 602, as disclosed below.

Since the (converted) input to the RLS filter 610 is known to be a smoothly incrementing 64-bit value, an amount (i.e., number N) of its least significant bits (LSBs) is also known to be smoothly incrementing. An example embodiment may run (apply) the RLS filter 610 on those 'N' LSBs (and adjust the MSBs as needed), enabling the circuit 602 to be more efficient (e.g., smaller adders, fewer flip-flops, etc.) relative to an implementation in which the RLS filter 610 is applied to the input in its entirety. For such an optimization, it may be useful to make sure that any increment of the current input timestamp 616 (i.e., $X_k^*$) is by an amount that is much smaller than 2^N—and, thus, a value of N may be chosen accordingly (affected by expected worst-case clock ratios in a chip implementing the circuit 602 and the type of synchronization mechanism used for synchronizing the received timestamp 608 to a clock domain of the circuit 602).

Theoretically, a similar "trick" of running the RLS filter 610 on 'N' LSBs could be employed with the original timestamp format of the received timestamp 608, however, such implementation would result in having to handle both cases of rollover, that is, one at 10^9 and another at 2^N. The 10^9 rollover is, however, costly because it's not a power-of-2 and, as such, involves several 30-bit logic elements (while N is typically <<30).

An example embodiment disclosed herein considers two types of rollover (values beyond 2^N): either the input, namely the current input timestamp 616 (i.e., $X_k^*$), rolls over first, or the filter estimate, namely, the current estimated timestamp value 638 (i.e., $\hat{X}_k$), rolls over first (that depends on whether the filter estimate is currently higher or lower than the input). In either case, according to an example embodiment, the recursive filter logic 604 may include the rollover detection logic 670 to detect such rollover, and the timestamp adjustment logic 666, to add 2^N to the value that rolled over first, that is, either the least-significant bit (LSB) portion 618 of the current timestamp value 616 (i.e., $X_k^*$) or the current estimated timestamp value 638 (i.e., $\hat{X}_k$), until the other one rolls over as well. This enables continuous computation of the correct difference between the two, as disclosed below where N is equal to 8 for non-limiting example.

With N=8, both the input to the RLS filter 610 and the estimate produced by the RLS filter 610 are increasing by 4 on every cycle (just for the sake of the non-limiting example), and the input rolls over first, as shown in Table 1, disclosed below, wherein the difference is incorrectly computed to be −247.

TABLE 1

No rollover logic (wrong difference computation).

| | Input | | | | | |
|---|---|---|---|---|---|---|
| | 246 | 250 | 254 | (input rolled over here) 2 | 6 | 10 |
| Estimate | 237 | 241 | 245 | 249 | 253 | 1 |
| Difference | 9 | 9 | 9 | −247 | −247 | 9 |

With the rollover detection logic 670, however, such differences are computed correctly as shown in Table 2, below.

TABLE 2

With rollover logic (correct difference computation).

| | Input | | | | | |
|---|---|---|---|---|---|---|
| | 246 | 250 | 254 | 2 (+2^8 => 258) | 6 (+2^8 => 262) | (both rolled over, no need to add 2^8 anymore) 10 |
| Estimate | 237 | 241 | 245 | 249 | 253 | 1 |
| Difference | 9 | 9 | 9 | 9 | 9 | 9 |

Similar reasoning applies if the filter estimate rolls over first.

In the circuit 602, the most significant bits (MSBs) of the filter estimate $\hat{X}_k$ (i.e., the current estimated timestamp value 638) may usually be taken as-is from the filter input $X_k^*$, that is, such bits may usually correspond to the MSB portion 619 of the current timestamp value 616 (i.e., $X_k^*$). On rollovers (wrap-arounds), however, an example embodiment of the timestamp adjustment logic 666 may be configured to adjust such MSB bits, as disclosed below.

According to an example embodiment, if the filter estimate $\hat{X}_k$ (i.e., the current estimated timestamp value 638) has rolled over first, that is, before the LSB portion 618 of the filter input $X_k^*$ (i.e., current timestamp value 616), the timestamp adjustment logic 666 may be configured to increase the MSB portion 619 by one and employ the incremented MSB portion 619 as an MSB portion of the filtered timestamp value 668. The adjusted timestamp 668 may be sampled via the FF 612i to produce a sampled version 671 of the adjusted timestamp 668 in the intermediate format. The filtered timestamp value 668 in the intermediate format represents the filtered timestamp 606 in the intermediate format.

According to an example embodiment, if the filter input, namely the LSB portion 618 of the current input timestamp 616 (i.e., $X_k^*$), rolls over first, the MSB portion 619 of the filter input $X_k^*$ has already been increased by 1. In an event the filter estimate $\hat{X}_k$ (i.e., the current estimated timestamp value 638) has not rolled over yet, the timestamp adjustment logic 666 may be configured to decrease the MSB portion 619 by one and employ same as the MSB portion of the filtered timestamp value 668. The filtered timestamp value 668 may be converted from the intermediate timestamp format to the original timestamp format to produce the filtered timestamp 606 that may be output by the circuit 602 as disclosed above.

Filter Reset

Continuing with reference to FIG. 6, as disclosed above, the reset logic 667 may be configured to assert (activate) the filter reset signal 679 based on a) the current timestamp value 616 (i.e., $X_k^*$), that is the filter input, and b) the sampled version 671 of the filtered timestamp value 668, which represents the filter's estimate. According to an example embodiment, the filter estimate and filter input may be 64-bit values {sec, frac sec} and the reset logic 667 may be configured to compute a difference between the filter input and output (its estimation) by subtracting the full 64-bit {sec, frac sec} filter estimate from the 64-bit {sec, frac sec}.

The reset logic 667 may, in turn, check that an amount of MSBs of the difference are the same (either all 1's or all 0's). If they're not, it means that the absolute value of the difference is larger than a threshold (determined by the number of MSBs being checked), and the filter reset signal 679 may be asserted to reset the circuit 602 and, thus, the RLS filter 610. Checking '64-M' MSB bits will detect a difference outside a range of $(-2^M \ldots 2^M-1)$. It should be understood that since the filter reset signal 679 is asserted based on the absolute value of the difference, it doesn't matter if the filter input is subtracted from the filter estimate or vice versa. The following non-limiting examples (1) through (4) are based on a 64-bit difference value in which a number of the MSBs being checked is fifty-six, resulting in detection of a difference outside the range of $(-256 \ldots 255)$.

Example (1)

Input=100=0x64
Output=110=0x6E
Difference=100−110=−10=0xFFFFFFFFFFFFFFF6 (bits 63 . . . 8 are all 1's)

Example (2)

Input=200=0xC8
Output=190=0xBE
Difference=200−190=+10=0x000000000000000A (bits 63 . . . 8 are all 0's)

Example (3)

Input=100=0x64
Output=400=0x190
Difference=100−400=−300=0xFFFFFFFFFFFFFED4 (bits 63 . . . 8 are NOT all 1's; nor all 0's→difference is outside the desired range)

Example (4)

Input=400=0x190
Output=100=0x64
Difference=400−100=+300=0x000000000000012C (bits 63 . . . 8 are NOT all 0's; nor all 1's→difference is outside the desired range)

In the non-limiting examples (1) through (4), disclosed above, the differences computed in examples (3) and (4) cause the reset logic 667 to assert the filter reset signal 679. The reset logic 667 may, for non-limiting example, be employed in the circuit 702 and circuit 802 of FIG. 7 and FIG. 8, respectively, disclosed below.

Figure 7:
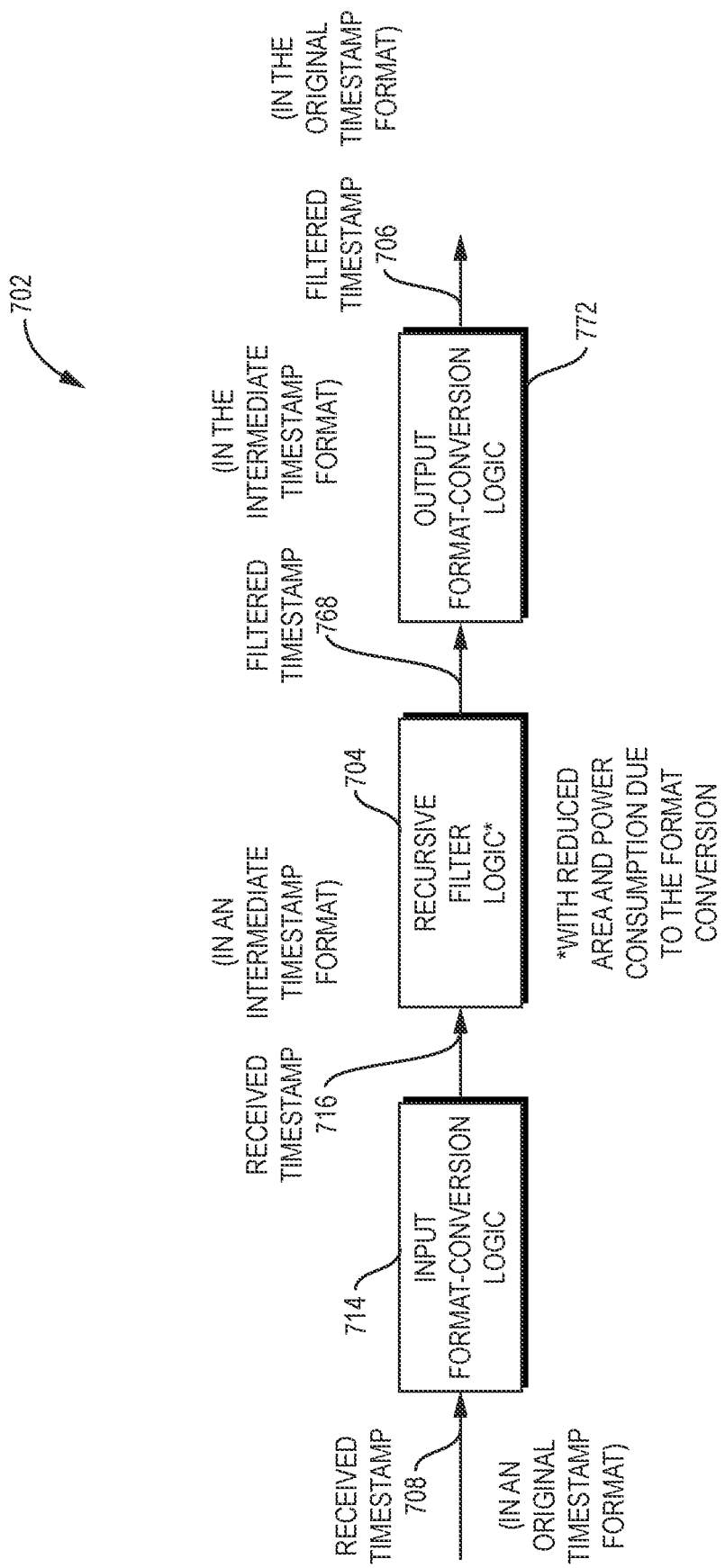
FIG. 7 is a block diagram of an example embodiment of a circuit for filtering a received timestamp.

FIG. 7 is a block diagram of an example embodiment of a circuit 702 for filtering a received timestamp 708. The circuit comprises input format-conversion logic 714 configured to convert the received timestamp 708 from an original format to an intermediate format. The circuit 702 further comprises recursive filter logic 704 coupled to the input format-conversion logic 714. The recursive filter logic 704 is configured to generate a filtered timestamp 768 in the intermediate format by filtering the received timestamp 716 in the intermediate format. The circuit 702 further comprises output format-conversion logic 772 coupled to the recursive filter logic 704. The output format-conversion logic 772 is configured to convert the filtered timestamp 768 from the intermediate timestamp format to the original timestamp format and output the filtered timestamp 706 in the original timestamp format. The original timestamp format may be based on seconds and nanoseconds and the intermediate timestamp format may be based on seconds and fractional seconds for non-limiting examples, as disclosed above. The circuit 702 may be implemented with reduced area and power consumption due to the format conversion, as disclosed above.

As disclosed above, logic to handle rollover of input values is relatively complicated and increases the area and power consumption of an implementation. A more efficient solution disclosed herein with regard to FIG. 6 and FIG. 7 is to convert the received timestamp (608, 708) into a different format, namely an intermediate timestamp format, that has small, bounded increments over an entire range of input values.

With reference to FIG. 6 and FIG. 7, the input format-conversion logic (614, 714) may include a first multiplier. The first multiplier may be configured to multiply the received timestamp (608, 708) in the original timestamp format by an input conversion value 613 configured to convert the original timestamp format to the intermediate timestamp format. The output format-conversion logic (672, 772) may include a second multiplier. The second multiplier may be configured to multiply the filtered timestamp (668, 768) in the intermediate timestamp format by an output conversion value 673 configured to convert the intermediate timestamp format to the original timestamp format. The input conversion value and the output conversion value may be configured such that a product of the input conversion value and the output conversion value is one for non-limiting example.

The recursive filter logic (604, 704) may be further configured to implement a recursive-least squares (RLS) filter 610. The RLS filter 610 may be configured to generate an estimated timestamp value, namely the current estimated timestamp value 638 (i.e., $\hat{X}_k$), of a target (ideal) timestamp based on at least a portion of the received timestamp in the intermediate format (e.g., the current timestamp value 616 (i.e., $X_k^*$), 716). The filtered timestamp (668, 768) in the intermediate format may be generated based on the estimated timestamp value generated. Thus, it follows that the filtered timestamp (606, 706) in the original format may also be generated based on the estimated timestamp value generated, that is, the current estimated timestamp value 638 (i.e., $\hat{X}_k$).

The RLS filter 610 may be further configured to determine a difference in consecutive values of the received timestamp in the intermediate format (e.g., the current timestamp value 616 (i.e., $X_k^*$), 716), with higher accuracy relative to determining the difference via the consecutive values of the received timestamp (608, 708) in the original format, as disclosed above.

An accuracy of the estimated timestamp value generated, that is, an accuracy of the current estimated timestamp value 638 (i.e., $\hat{X}_k$), may be improved based on conversion of the received timestamp (608, 708) from the original format to the intermediate format. The accuracy may be improved relative to generating the estimated timestamp value of the target timestamp based on the at least a portion of the received timestamp (608, 708) in the original format, as disclosed above.

Further alternative circuit 702 embodiments may parallel those described above in connection with the example circuit embodiment of FIG. 6. Another example embodiment of a circuit for filtering a timestamp is disclosed below, with regard to FIG. 8.

Figure 8:
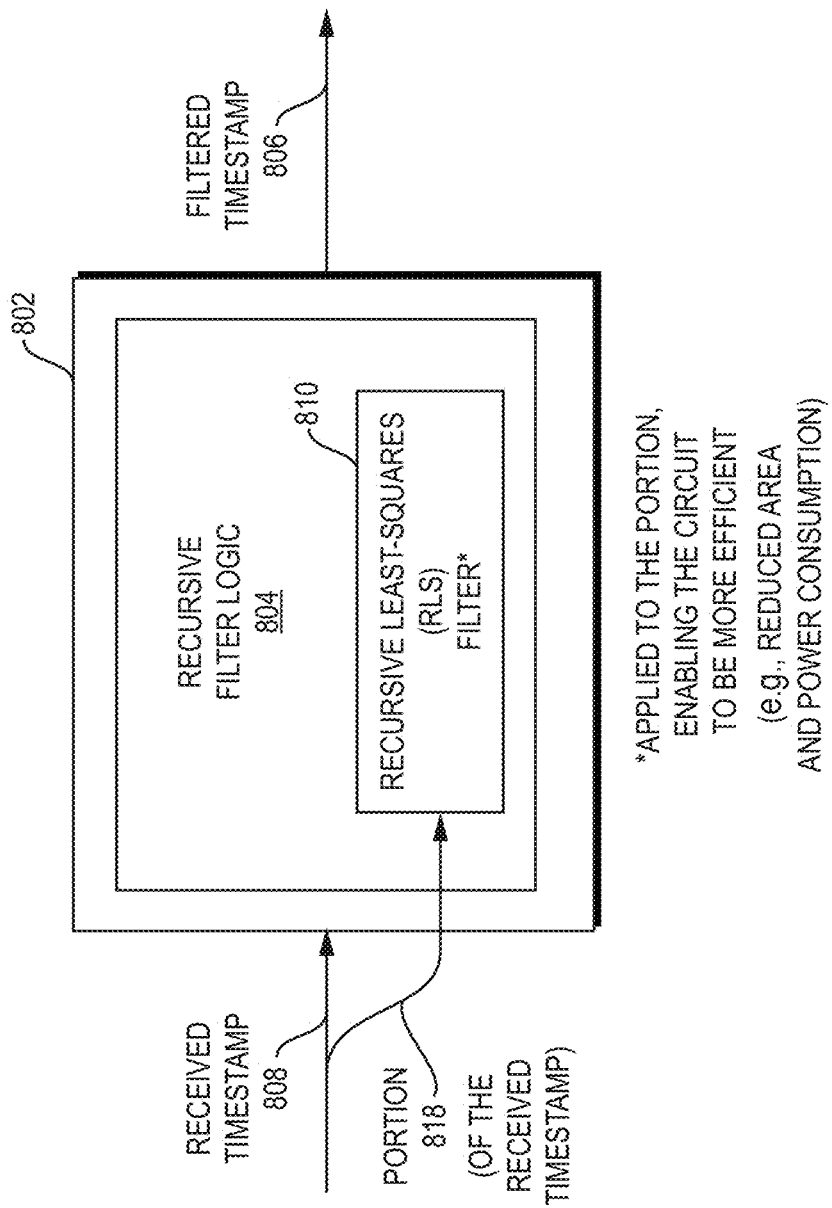
FIG. 8 is a block diagram of another example embodiment of a circuit for filtering a received timestamp.
Figure 9A:
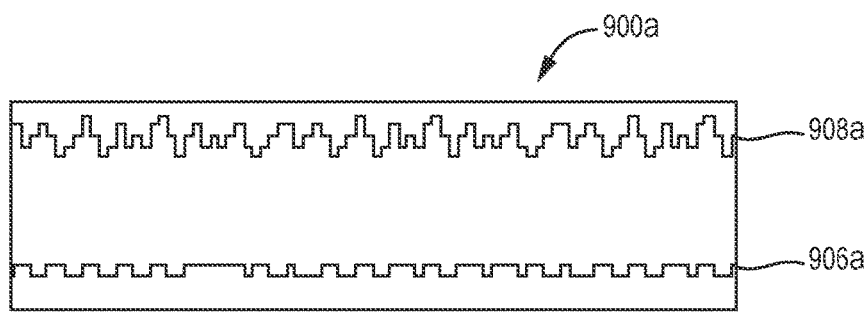
FIGS. 9A-E are graphs of example embodiments of waveforms that show timestamp jitter before and after filtering via an example embodiment of a circuit disclosed herein.
Figure 9B:
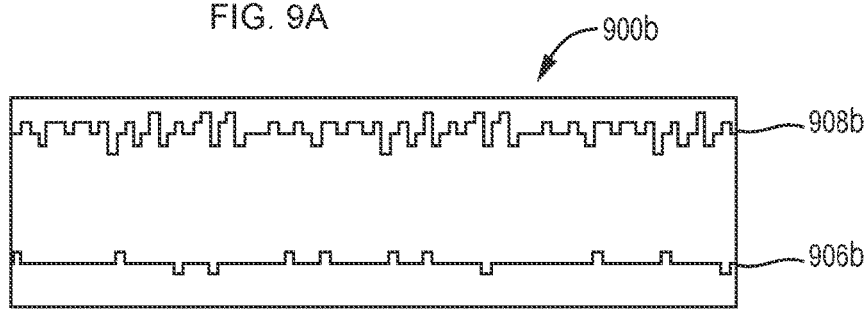
Figure 9C:
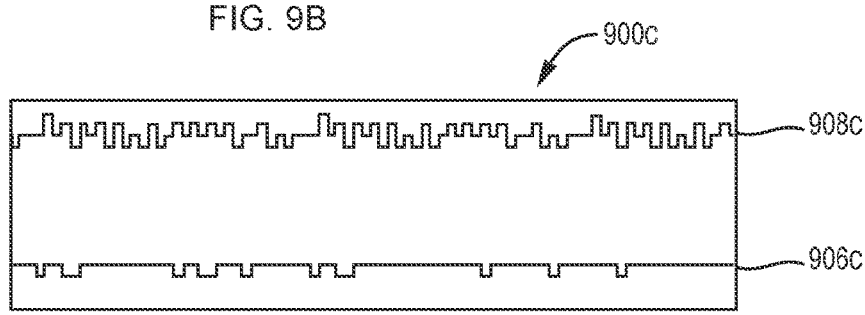
Figure 9D:
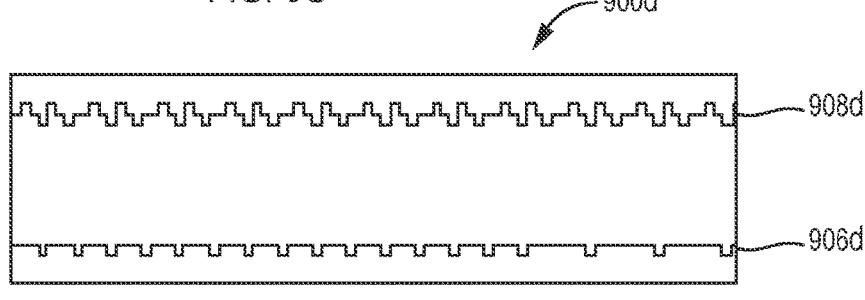
Figure 9E:
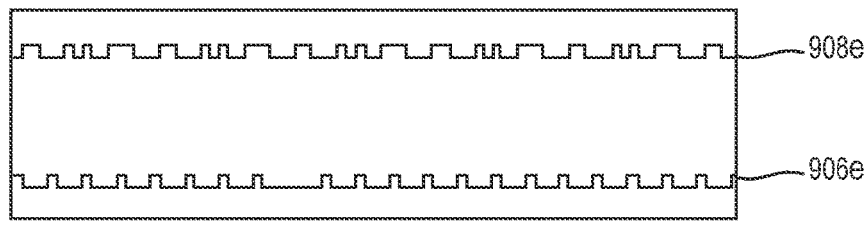

FIG. 8 is a block diagram of another example embodiment of a circuit 802 for filtering a received timestamp 808. The circuit 802 comprises recursive filter logic 804 configured to implement a recursive least-squares (RLS) filter 810. The circuit 802 is configured to generate a filtered timestamp 806 from a received timestamp 808 by filtering the received timestamp 808 via the recursive filter logic 804. The recursive filter logic 804 is configured to apply the RLS filter 810 to a portion 818 of the received timestamp 808. A number of bits of the portion 818 is less relative to a total number of bits of the received timestamp. The circuit 802 is further configured to output the filtered timestamp 806 generated. Applying the RLS filter 810 to the portion 818 enables the circuit 802 to be more efficient (e.g., smaller adders, fewer-flipflops flip- flops, etc.) relative to an implementation in which the RLS filter 810 is applied to the received timestamp 808 in its entirety.

According to a non-limiting example embodiment, the portion 818 may be a least significant bit (LSB) portion of the received timestamp 808, wherein the LSB portion is of lesser significance relative to a most significant bit (MSB) portion (not shown) of the received timestamp.

With reference to FIG. 6 and FIG. 8, the RLS filter (610, 810) may be configured to generate, based on the LSB portion (618, 818), an estimated timestamp value of a target (ideal) timestamp (not shown), as disclosed above. The circuit (602, 802) may be further configured to generate the filtered (606, 806) timestamp based on the estimated timestamp value generated, namely the current estimated timestamp value 638 (i.e., $\hat{X}_k$).

The circuit (610, 810) may further comprise input format-conversion logic 614 coupled to the recursive filter logic (604, 804). The input format-conversion logic 614 may be configured to convert the received timestamp (608, 808) from an original format to an intermediate format. The circuit (602, 802) may be configured to input the received timestamp in the intermediate format, that is, the current timestamp value 616 (i.e., $X_k^*$), to the recursive filter logic (608, 808).

The recursive filter logic (608, 808) may be further configured to apply the RLS filter (610, 810) to the LSB portion (618, 818) of the received timestamp in the intermediate format, namely the current timestamp value 616 (i.e., $X_k^*$), and generate the filtered timestamp in the intermediate format, namely the filtered timestamp value 668. The circuit (602, 802) may further comprise output format-conversion logic 672 coupled to the recursive filter logic (608, 808). The output format-conversion logic 672 may be configured to convert the filtered timestamp from the intermediate timestamp format to the original timestamp format and output the filtered timestamp (606, 806) in the original timestamp format.

The circuit (602, 802) may further comprise rollover detection logic 670. The rollover detection logic 670 may be configured to generate a rollover detection signal 660 based on a comparison of the LSB portion (618, 818) and the estimated timestamp value generated, that is, the current estimated timestamp value 638 (i.e., $\hat{X}_k$). The circuit (602, 802) may be further configured to generate the filtered timestamp (606, 806) based on the estimated timestamp value generated, the rollover detection signal 660, and the MSB portion 619.

The circuit (602, 802) may further comprise timestamp adjustment logic 666. The timestamp adjustment logic 666 may be configured to generate the filtered timestamp value 668 of the filtered timestamp based on the estimated timestamp value generated, that is, the current estimated timestamp value 638 (i.e., $\hat{X}_k$), and the MSB portion 619.

As disclosed above, the timestamp adjustment logic 666 may be further configured to adjust the estimated timestamp value generated or the MSB portion 619 responsive to the rollover detection signal 660 indicating that a) the estimated timestamp value generated has rolled over prior to roll over of the MSB portion 619 or b) the MSB portion 619 has rolled over prior to roll over of the estimated timestamp value generated, respectively.

In an event the rollover detection signal 660 has indicated a), the timestamp adjustment logic 666 may be further configured to increment, on a cycle-by-cycle basis, the estimated timestamp value generated and, responsive to the rollover detection signal 660 subsequently indicating that the MSB portion 619 has rolled over, to stop incrementing of the estimated timestamp value generated.

In an event the rollover detection signal 660 has indicated (b), the timestamp adjustment logic 666 may be further configured to increment, on a cycle-by-cycle basis, the MSB portion 619 and, responsive to the rollover detection signal 660 subsequently indicating that the estimated timestamp value has rolled over, to stop incrementing the MSB portion 619.

Further alternative circuit 802 embodiments may parallel those described above in connection with the example circuit 602 embodiment of FIG. 6. As disclosed above, an example embodiment reduces jitter of receive timestamp. Such jitter reduction is disclosed below with regard to FIGS. 9A-E.

FIGS. 9A-E are graphs of example embodiments of waveforms that show timestamp jitter before and after filtering via an example embodiment of a circuit disclosed herein, such as the circuits 102, 202, 602, 702, and 802, disclosed above with regard to FIG. 1, FIG. 2, and FIGS. 6-8, respectively. The graphs show differences between ideal and filtered/unfiltered timestamps, as disclosed below. Each of the graphs, namely the graphs 900a-e, includes an upper waveform and a lower waveform. For example, the graphs 900a, 900b, 900c, 900d, and 900e include the upper waveforms 908a, 908b, 908c, 908d, and 908e, respectively, and the lower waveforms 906a, 906b, 906c, 906d, and 906e, respectively.

The upper waveforms (908a, 908b, 908c . . . 908e) represent differences (jitter) between an unfiltered timestamp (not shown) and an ideal timestamp (not shown). The unfiltered timestamp is a synchronized timestamp that is output from a synchronizer, such as the synchronized timestamp 208 that is output from the TS synchronization circuit 221 of FIG. 2, disclosed above. The unfiltered timestamp may be the received timestamp 108, synchronized timestamp 208, received timestamp 608, received timestamp 708, or received timestamp 808, disclosed above with regard to FIG. 1, FIG. 2, and FIGS. 6-8, respectively.

With reference to FIG. 2 and FIGS. 9A-E, the unfiltered timestamp is the synchronized timestamp 208 generated by synchronizing the original timestamp 207 across multiple clock domains, that is, from the first clock domain driven by the first clock 217 (i.e., clk A), to the second clock domain driven by the second clock 219 (i.e., clk B). In the example embodiments of FIGS. 9A-E, and with reference to FIG. 2, clk A has a frequency of 350 MHz, 550 MHz, 750 MHz, 1000 MHz, and 1300 MHz, respectively, and clk B has a frequency of 800 MHz. It should be understood, however, that frequencies of clk A and clk B are not limited thereto.

As shown in the graphs 900a-e, synchronizing from 350 MHz->800 MHz, 550 MHz->800 MHz, 750 MHz->800 MHz, 1000 MHz->800 MHz, and 1300 MHz->800 MHz, respectively, produces a respective synchronized timestamp 208 that has respective jitter represented by the upper waveforms 908a-e, respectively. By filtering (e.g., via a RLS filter disclosed herein) such an unfiltered timestamp, that is, the synchronized timestamp 208, via the filter circuit 202, however, a respective filtered timestamp 206 is produced with the jitter reduced, as represented by the lower waveforms 906a-e, respectively. The lower waveforms 906a-e each represent respective differences (jitter) between a respective filtered timestamp 206 and the respective ideal timestamp, where the respective ideal timestamp is a +1/ns counter for non-limiting example.

A comparison between the upper waveforms 908a-e (jitter out of the synchronizer) and the respective lower waveforms 906a-e (jitter after filtering via recursive filter logic disclosed herein) shows that the maximum jitter is reduced by up to 50% (1-2 ns in the clock ratios employed in the example embodiments of FIGS. 9A-E) and standard deviation of the jitter is also reduced by 30-50%.

Figure 10:
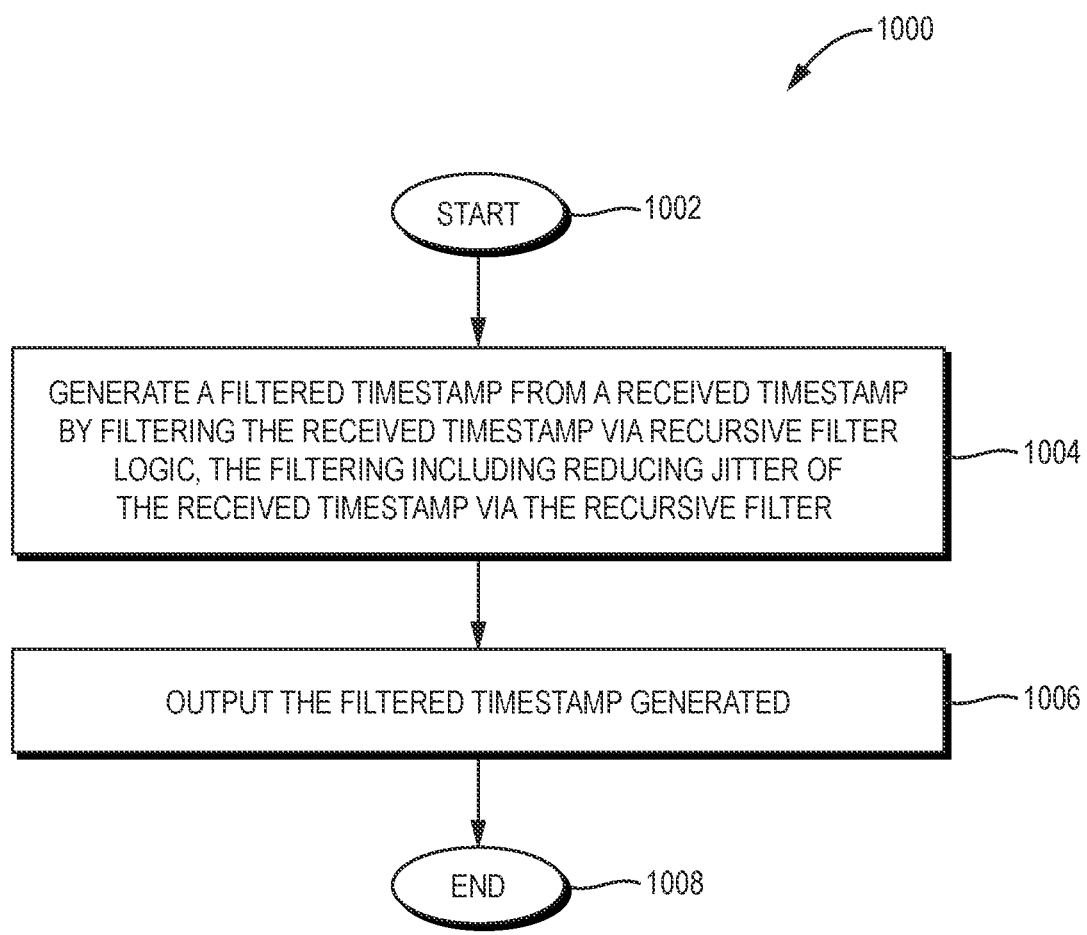
FIG. 10 is a flow diagram of an example embodiment of a method for timestamp jitter reduction.

FIG. 10 is a flow diagram 1000 of an example embodiment of a method for timestamp jitter reduction. The method begins (1002) and generates a filtered timestamp from a received timestamp by filtering the received timestamp via recursive filter logic, the filtering including reducing jitter of the received timestamp via the recursive filter logic, the jitter representing a deviation from a target timestamp (1004). The method outputs the filtered timestamp generated and thereafter ends (1008) in the example embodiment.

The outputting may include outputting the filtered timestamp generated to a timestamp consumer. For non-limiting example, the timestamp consumer may associate an incoming packet, outgoing packet, or combination thereof, with the filtered timestamp generated and output.

The method may further comprise receiving the received timestamp on a cycle-by-cycle basis. The generating may include generating the filtered timestamp in real time, on the cycle-by-cycle basis.

The jitter of the received timestamp may have a maximum value and an average value and reducing the jitter may include reducing the maximum value of the jitter, average value of the jitter, or a combination thereof, in the filtered timestamp generated.

The method may further comprise receiving the received timestamp on a cycle-by-cycle basis, generating an estimated timestamp value of the target timestamp on the cycle-by-cycle basis, and generating the filtered timestamp on the cycle-by-cycle basis, based on the estimated timestamp value generated.

The method may further comprise generating an estimated timestamp value of the target timestamp based on the received timestamp and generating the filtered timestamp based on the estimated timestamp value generated.

The method may further comprise generating a current estimated timestamp value of the target timestamp and generating a current estimated line slope value of a line slope of a linear function. The linear function may represent the target timestamp. The current estimated timestamp value may be generated based on a previous estimated timestamp value of the target timestamp and a previous estimated line slope value of the line slope of the linear function. The previous estimated timestamp value and previous estimated line slope value may be generated prior to generation of the current estimated timestamp value and current estimated line slope value, respectively.

The method may further comprise generating, in a previous clock cycle, the previous estimated timestamp value and the previous estimated line slope value. The previous clock cycle may immediately precede a current clock cycle in which the current estimated timestamp value and current estimated line slope value are generated by the RLS filter.

The method may further comprise generating the current estimated timestamp value based on a product of the previous estimated timestamp value and a number of clock cycles that transpired since a last update of the received timestamp. The number of clock cycles may be one for non-limiting example.

The method may further comprise employing a first filter gain and a second filter gain, generating a current estimated timestamp value of the target timestamp, generating a current estimated line slope value of a line slope of a linear function, and generating a residual error. The linear function may represent the target timestamp. The current estimated timestamp value generated may be based on the first filter gain and the residual error. The current estimated line slope value generated may be based on the second filter gain and the residual error.

The method may further comprise generating a filter step value. The first filter gain and the second filter gain may be based on the filter step value generated. Generating the filter step value may include incrementing the filter step value on a cycle-by-cycle basis. The filter step value may be associated with a threshold value. In an event the filter step value reaches the threshold value, generating the filter step value may include maintaining the filter step value at the threshold value.

The method may further comprise generating, in a previous clock cycle, the previous estimated timestamp value and previous estimated line slope value. The previous clock cycle may immediately precede a current clock cycle in which the current estimated timestamp value and current estimated line slope value are generated.

The method may further comprise generating the residual error based on a current timestamp value of the received timestamp, generating a previous estimated timestamp value of the target timestamp, and generating a previous estimated line slope value of a line slope of the linear function. The previous estimated timestamp value and the previous estimated line slope value may be generated prior to generation of the current estimated timestamp value and the current estimated line slope value, respectively.

The method may further comprise generating the residual error based on a number of clock cycles that transpired since a last update of the received timestamp. The number of clock cycles may be one for non-limiting example.

The received timestamp may be a synchronized timestamp of an original timestamp and the method may further comprise computing a residual error and resetting the recursive filter logic, automatically, based on the residual error computed.

Figure 11:
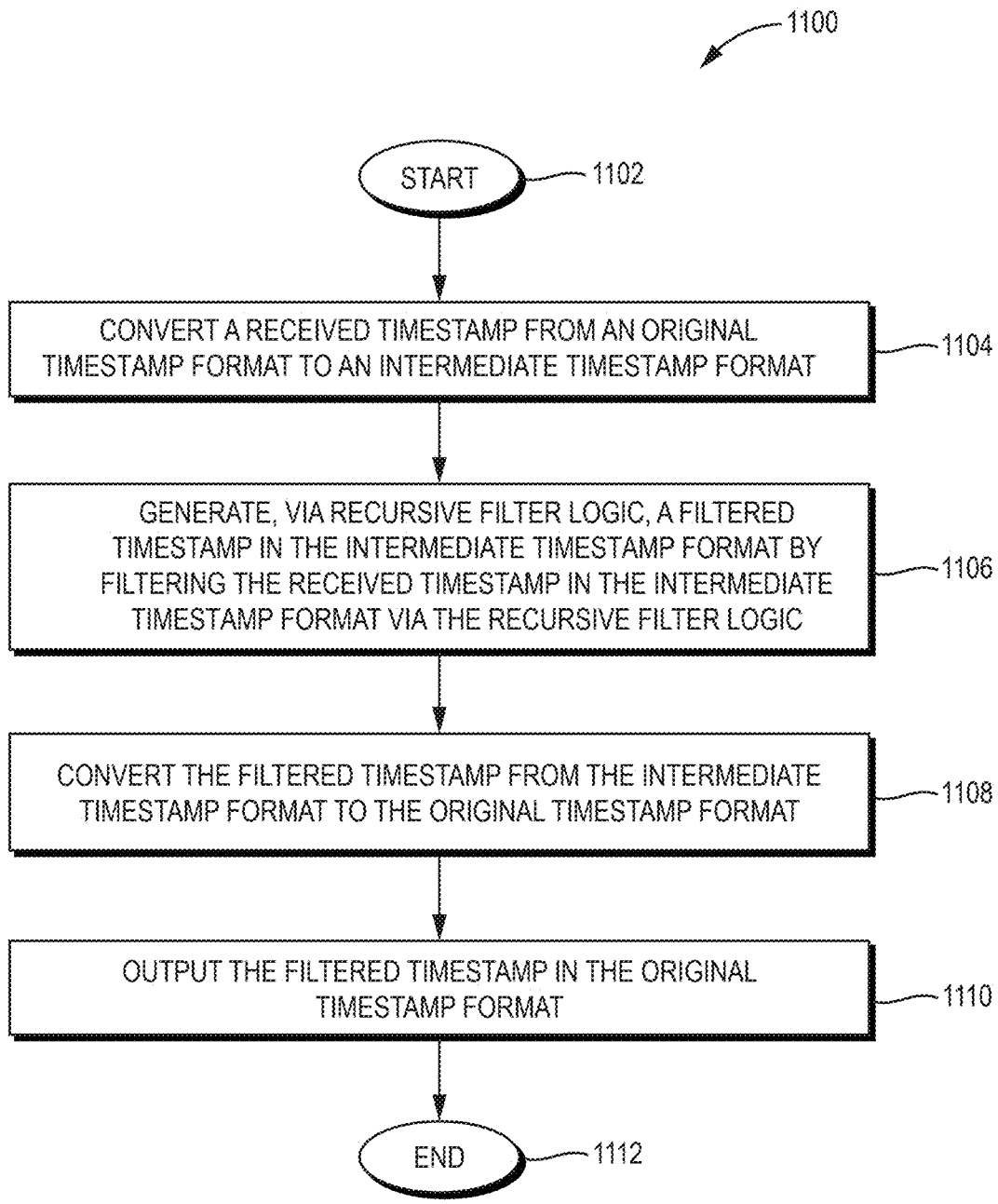
FIG. 11 is a flow diagram of an example embodiment of a method for filtering a timestamp.

FIG. 11 is a flow diagram 1100 of an example embodiment of a method for filtering a timestamp. The method begins (1102) and comprises converting a received timestamp from an original format to an intermediate format (1104). The method comprises generating, via recursive filter logic, a filtered timestamp in the intermediate format by filtering the received timestamp in the intermediate format via the recursive filter logic (1106). The method comprises converting the filtered timestamp from the intermediate timestamp format to the original timestamp format (1108) and outputting the filtered timestamp in the original timestamp format (1110). The method thereafter ends (1112) in the example embodiment.

The original timestamp format is based on seconds and nanoseconds and wherein the intermediate timestamp format is based on seconds and fractional seconds.

Converting the received timestamp from the original format to the intermediate format may include multiplying the received timestamp in the original timestamp format by an input conversion value configured to convert the original timestamp format to the intermediate timestamp format. Converting the filtered timestamp from the intermediate timestamp format to the original timestamp format may include multiplying the filtered timestamp in the intermediate timestamp format by an output conversion value configured to convert the intermediate timestamp format to the original timestamp format. The input conversion value and the output conversion value may be configured such that a product of the input conversion value and the output conversion value is one.

The method may further comprise determining a difference in consecutive values of the received timestamp, in the intermediate format, wherein the difference is determined with higher accuracy relative to determining the difference via the consecutive values of the received timestamp, in the original format.

The method may further comprise generating an estimated timestamp value of a target timestamp based on at least a portion of the received timestamp in the intermediate format and generating the filtered timestamp based on the estimated timestamp value generated.

The method may further comprise improving accuracy of the estimated timestamp value generated. The accuracy may be improved based on conversion of the received timestamp from the original format to the intermediate format. The accuracy may be improved relative to generating the estimated timestamp value of the target timestamp based on the at least a portion of the received timestamp, in the original format.

Further alternative method embodiments may parallel those described above in connection with the example method embodiment of FIG. 10. Another example embodiment of a method for filtering a timestamp is disclosed below, with regard to FIG. 12.

Figure 12:
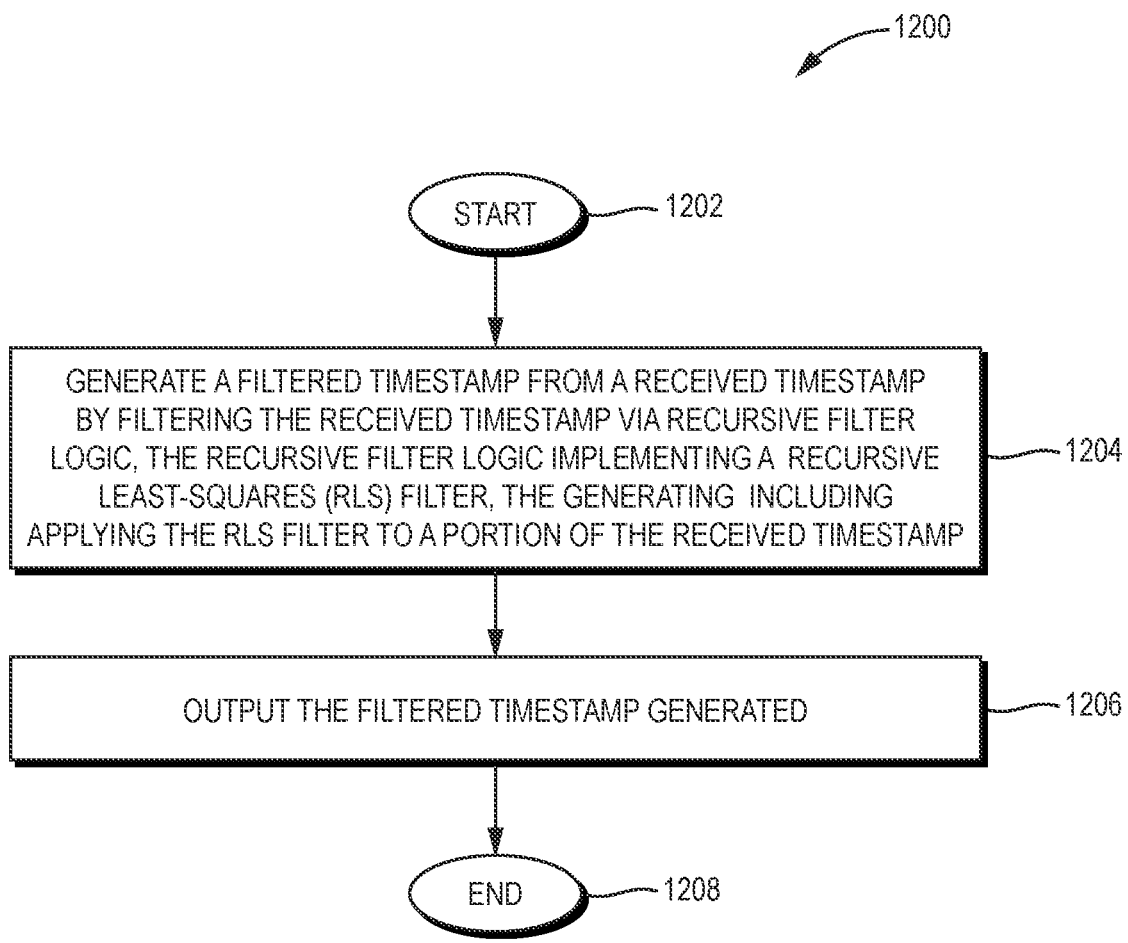
FIG. 12 is a flow diagram of another example embodiment of a method for filtering a timestamp.

FIG. 12 is a flow diagram 1200 of another example embodiment of a method for filtering a timestamp. The method begins (1202) and comprises generating a filtered timestamp from a received timestamp by filtering the received timestamp via recursive filter logic (1204). The recursive filter logic implements a recursive least-squares (RLS) filter. The received timestamp includes a most-significant bit (MSB) portion and a least-significant bit (LSB) portion, the LSB portion of lesser significance relative to the MSB portion. The generating includes applying the RLS filter to the LSB portion of the received timestamp. The method further comprises outputting the filtered timestamp generated (1206) and thereafter ends (1208) in the example embodiment.

The method may further comprise generating, based on the LSB portion, an estimated timestamp value of a target timestamp via the RLS filter and generating the filtered timestamp based on the estimated timestamp value generated.

The method may further comprise converting the received timestamp from an original format to an intermediate format and inputting the received timestamp in the intermediate format to the recursive filter logic. The applying may include applying the RLS filter to the LSB portion of the received timestamp in the intermediate format. The generating may include generating the filtered timestamp in the intermediate format. The method may further comprise converting the filtered timestamp from the intermediate timestamp format to the original timestamp format and outputting the filtered timestamp in the original timestamp format.

The method may further comprise generating, based on the LSB portion, an estimated timestamp value of a target timestamp via the RLS filter. The method may further comprise generating a rollover detection signal based on a comparison of the LSB portion and the estimated timestamp value generated. The method may further comprise generating the filtered timestamp based on the estimated timestamp value generated, the rollover detection signal, and the MSB portion.

The method may further comprise generating, based on the LSB portion, an estimated timestamp value of a target timestamp via the RLS filter and generating a filtered timestamp value of the filtered timestamp based on the estimated timestamp value generated and the MSB portion.

The method may further comprise generating a rollover detection signal based on a comparison of the LSB portion and the estimated timestamp value generated. The method may further comprise adjusting the estimated timestamp value generated or the MSB portion responsive to the rollover detection signal indicating that (a) the estimated timestamp value generated has rolled over prior to roll over of the MSB portion or (b) the MSB portion has rolled over prior to roll over of the estimated timestamp value generated, respectively.

In an event the rollover detection signal has indicated (a), the adjusting includes incrementing, on a cycle-by-cycle basis, the estimated timestamp value generated and responsive to the rollover detection signal subsequently indicating that the MSB portion has rolled over, stopping the incrementing.

In an event the rollover detection signal has indicated (b), the adjusting includes incrementing, on a cycle-by-cycle basis, the MSB portion and, responsive to the rollover detection signal subsequently indicating that the estimated timestamp value has rolled over, stopping the incrementing. Further alternative method embodiments may parallel those described above in connection with the example method embodiment of FIG. 10.

Further example embodiments disclosed herein may be configured using a computer program product; for example, controls may be programmed in software for implementing example embodiments. Further example embodiments may include a non-transitory, computer-readable medium containing instructions that may be executed by a processor, and, when loaded and executed, cause the processor to complete methods described herein. It should be understood that elements of the block and flow diagrams may be implemented in software or hardware, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A circuit comprising:
    input format-conversion logic configured to convert a received timestamp from an original timestamp format to an intermediate timestamp format;
    recursive filter logic coupled to the input format-conversion logic, the recursive filter logic configured to generate a filtered timestamp in the intermediate timestamp format by filtering the received timestamp in the intermediate timestamp format; and
    output format-conversion logic coupled to the recursive filter logic, the output format-conversion logic configured to convert the filtered timestamp from the intermediate timestamp format to the original timestamp format and output the filtered timestamp in the original timestamp format.

2. The circuit of claim 1, wherein the original timestamp format is based on seconds and nanoseconds and wherein the intermediate timestamp format is based on seconds and fractional seconds.

3. The circuit of claim 1, wherein:
    the input format-conversion logic includes a first multiplier, the first multiplier configured to multiply the received timestamp in the original timestamp format by an input conversion value configured to convert the original timestamp format to the intermediate timestamp format;
    the output format-conversion logic includes a second multiplier, the second multiplier configured to multiply the filtered timestamp in the intermediate timestamp format by an output conversion value configured to convert the intermediate timestamp format to the original timestamp format; and
    the input conversion value and the output conversion value are configured such that a product of the input conversion value and the output conversion value is one.

4. The circuit of claim 1, wherein the recursive filter logic is further configured to implement a recursive-least squares (RLS) filter, the RLS filter configured to generate an estimated timestamp value of a target timestamp based on at least a portion of the received timestamp, in the intermediate timestamp format, the filtered timestamp generated based on the estimated timestamp value generated.

5. The circuit of claim 4, wherein the RLS filter is further configured to determine a difference in consecutive values of the received timestamp, in the intermediate timestamp format, with higher accuracy relative to determining the difference via the consecutive values of the received timestamp, in the original timestamp format.

6. The circuit of claim 4, wherein accuracy of the estimated timestamp value generated is improved based on conversion of the received timestamp from the original timestamp format to the intermediate timestamp format, the accuracy improved relative to generating the estimated timestamp value of the target timestamp based on the at least a portion of the received timestamp, in the original timestamp format.

7. The circuit of claim 1, wherein the recursive filter logic is further configured to reduce jitter in the filtered timestamp relative to jitter of the received timestamp, the jitter of the received timestamp representing a deviation of the received timestamp from a target timestamp.

8. The circuit of claim 1, wherein the circuit is further configured to output the filtered timestamp generated to a timestamp consumer and wherein the timestamp consumer is configured to associate an incoming packet, outgoing packet, or combination thereof, with the filtered timestamp generated and output from the circuit.

9. The circuit of claim 1, wherein the received timestamp is received on a cycle-by-cycle basis, wherein the recursive filter logic is further configured to generate the filtered timestamp in real time, on the cycle-by-cycle basis, and wherein the cycle-by-cycle basis is based on a clock cycle of a clock of the circuit.

10. The circuit of claim 1, wherein:
the recursive filter logic is further configured to reduce jitter in the filtered timestamp relative to jitter of the received timestamp;
the received timestamp is a synchronized timestamp, generated from an original timestamp by synchronizing the original timestamp across multiple clock domains; and
the jitter reduced is dynamic jitter generated from the synchronizing.

11. A method comprising:
converting a received timestamp from an original timestamp format to an intermediate timestamp format;
generating, via recursive filter logic, a filtered timestamp in the intermediate timestamp format by filtering the received timestamp in the intermediate timestamp format via the recursive filter logic;
converting the filtered timestamp from the intermediate timestamp format to the original timestamp format; and
outputting the filtered timestamp in the original timestamp format.

12. The method of claim 11, wherein the original timestamp format is based on seconds and nanoseconds and wherein the intermediate timestamp format is based on seconds and fractional seconds.

13. The method of claim 11, wherein:
converting the received timestamp from the original timestamp format to the intermediate timestamp format includes multiplying the received timestamp in the original timestamp format by an input conversion value configured to convert the original timestamp format to the intermediate timestamp format;
converting the filtered timestamp from the intermediate timestamp format to the original timestamp format includes multiplying the filtered timestamp in the intermediate timestamp format by an output conversion value configured to convert the intermediate timestamp format to the original timestamp format; and the input conversion value and the output conversion value are configured such that a product of the input conversion value and the output conversion value is one.

14. The method of claim 11, further comprising determining a difference in consecutive values of the received timestamp, in the intermediate timestamp format, wherein the difference is determined with higher accuracy relative to determining the difference via the consecutive values of the received timestamp, in the original timestamp format.

15. The method of claim 11, further comprising:
generating an estimated timestamp value of a target timestamp based on at least a portion of the received timestamp in the intermediate timestamp format; and
generating the filtered timestamp based on the estimated timestamp value generated.

16. The method of claim 15, further comprising improving accuracy of the estimated timestamp value generated, the accuracy improved based on conversion of the received timestamp from the original timestamp format to the intermediate timestamp format, the accuracy improved relative to generating the estimated timestamp value of the target timestamp based on the at least a portion of the received timestamp, in the original timestamp format.

17. The method of claim 11, further comprising reducing jitter in the filtered timestamp via the recursive filter logic, the jitter reduced relative to jitter of the received timestamp, the jitter of the received timestamp representing a deviation of the received timestamp from a target timestamp.

18. The method of claim 11, wherein the outputting includes outputting the filtered timestamp generated to a timestamp consumer, the timestamp consumer associating an incoming packet, outgoing packet, or combination thereof, with the filtered timestamp generated and output.

19. The method of claim 11, further comprising receiving the received timestamp on a cycle-by-cycle basis and generating the filtered timestamp in real time, on the cycle-by-cycle basis.

20. The method of claim 11, further comprising reducing, via the recursive filter logic, jitter in the filtered timestamp relative to jitter of the received timestamp, wherein the received timestamp is a synchronized timestamp, generated from an original timestamp by synchronizing the original timestamp across multiple clock domains, and wherein the jitter reduced is dynamic jitter generated from the synchronizing.

21. An apparatus comprising:
means for converting a received timestamp from an original timestamp format to an intermediate timestamp format;
means for generating a filtered timestamp in the intermediate timestamp format by filtering the received timestamp in the intermediate timestamp format via recursive filter logic;
means for converting the filtered timestamp from the intermediate timestamp format to the original timestamp format; and
means for outputting the filtered timestamp in the original timestamp format.

22. The circuit of claim 1, wherein the recursive filter logic is further configured to compute a residual error, wherein the circuit further comprises reset logic, and wherein the reset logic is configured to reset the recursive filter logic, automatically, based on the residual error computed.

23. The circuit of claim 1, wherein the recursive filter logic is further configured to:

implement a RLS filter; and apply the RLS filter to a portion of the received timestamp, wherein the portion is a least significant bit (LSB) portion of the received timestamp and wherein the LSB portion is of lesser significance relative to a most significant bit (MSB) portion of the received timestamp.

24. The circuit of claim 1, wherein the recursive filter logic is further configured to implement a RLS filter and wherein the RLS filter is configured to employ a first filter gain and a second filter gain.

25. The circuit of claim 24, wherein respective values of the first filter gain and second filter gain are rounded to a nearest power-of-two.

26. The circuit of claim 24, wherein the recursive filter logic includes filter-step control logic configured to generate a filter step value, wherein the first filter gain and the second filter gain are based on the filter step value, wherein the filter-step control logic is further configured to increment the filter step value on a cycle-by-cycle basis, wherein the filter step value is associated with a threshold value, and wherein, in an event the filter step value reaches the threshold value, the filter-step control logic is further configured to maintain the filter step value at the threshold value.

27. The circuit of claim 25, wherein the threshold value is sixteen.

* * * * *